(12) United States Patent
Vanderploeg et al.

(10) Patent No.: US 7,407,618 B2
(45) Date of Patent: Aug. 5, 2008

(54) MOLDED ARTICLE WORK PIECE APPLICATION METHOD

(75) Inventors: James A. Vanderploeg, Loretto (CA); Jacek Kalemba, Mississauga (CA); Nicholas Seston, Rosemont (CA)

(73) Assignee: Husky Injection Molding Systems Ltd. (CA)

(*) Notice: Subject to any disclaimer, the term of this patent is extended or adjusted under 35 U.S.C. 154(b) by 361 days.

(21) Appl. No.: 11/184,990

(22) Filed: Jul. 20, 2005

(65) Prior Publication Data

US 2005/0280187 A1 Dec. 22, 2005

Related U.S. Application Data

(62) Division of application No. 10/287,809, filed on Nov. 5, 2002, now abandoned.

(51) Int. Cl.
*B29C 45/14* (2006.01)
*B29C 45/40* (2006.01)

(52) U.S. Cl. .................. 264/509; 264/238; 264/328.1; 264/334

(58) Field of Classification Search ............. 264/328.1, 264/334, 509, 238
See application file for complete search history.

(56) References Cited

U.S. PATENT DOCUMENTS

| | | | |
|---|---|---|---|
| 3,784,261 A | 1/1974 | Potter et al. | |
| 4,340,352 A | 7/1982 | Hayberg | |
| 4,351,630 A * | 9/1982 | Hayberg et al. | ............. 425/517 |
| 4,589,840 A | 5/1986 | Schad | |
| 4,616,992 A | 10/1986 | Oles | |
| 4,679,997 A | 7/1987 | Plenzler et al. | |
| 4,784,592 A | 11/1988 | Dromigny | |
| RE33,237 E | 6/1990 | Delfer, III | |
| 4,976,603 A | 12/1990 | Disomone | |
| 5,037,597 A | 8/1991 | McGinley et al. | |
| 5,234,328 A | 8/1993 | Willson | |
| 5,295,802 A | 3/1994 | Hersbt | |
| 5,518,387 A | 5/1996 | Di Simone | |
| 5,520,876 A | 5/1996 | Dobler | |
| 5,527,173 A | 6/1996 | Miller et al. | |
| 5,527,174 A * | 6/1996 | Godin et al. | ............. 425/126.1 |
| 5,709,833 A | 1/1998 | Simone | |
| 5,951,936 A * | 9/1999 | Coxhead | ................... 264/328.1 |
| 6,162,037 A * | 12/2000 | Verwoerd | ................ 425/126.1 |
| 6,264,419 B1 | 7/2001 | Schinzel | |
| 6,485,285 B1 | 11/2002 | Shiotani | |

* cited by examiner

*Primary Examiner*—Jill L Heitbrink
(74) *Attorney, Agent, or Firm*—Katten Muchin Rosenman LLP

(57) ABSTRACT

Servo side shuttle apparatus and method for a molding machine includes structure and/or steps whereby a shuttle plate is disposed adjacent at least one of a first mold half and a second mold half of the molding machine. A guidance assembly is coupled to the mold half and guides the shuttle plate linearly across a molding face of the mold half. A drive mechanism is provided to drive the shuttle plate in a linear direction. An operation structure is coupled to the shuttle plate and is configured to perform an operation on a molded article disposed either in the mold cavity or on the mold core. The operation may include removing the molded article from a mold core, applying a label to a mold cavity, and/or closing the lid of a molded article while it is resident on the mold core.

9 Claims, 23 Drawing Sheets

MOLDED ARTICLE WORK PIECE APPLICATION METHOD

This application is a divisional of U.S. patent application Ser. No. 10/287,809, filed Nov. 5, 2002 now abandoned, incorporated herein by reference.

BACKGROUND OF THE INVENTION

1. Field of the Invention

The present invention relates to apparatus and method for performing operations on one or more molded articles in one or more mold cavities and/or mold cores. More particularly, the present invention relates to a side shuttle apparatus and method whereby various in-mold operations (such as extracting the plastic molded articles from their mold cavities or cores, applying labels to the plastic molded articles, providing various inserts into the mold cavity, closing a cap of a molded container, etc.) can be quickly and easily carried out.

2. Related Art

In the injection molding art, it is desirable to carry out various operations on the just-molded plastic articles while they are still resident (or partially resident) in their respective mold cavities (or on their respective mold cores). For example, it would be advantageous to provide structure for removing the just-molded articles, for adding product labels, for providing various structural inserts, for rotating or manipulating the molded article in some way, conducting part inspection using a vision system, in-mold decoration (e.g. priming, painting), transfer molded articles from one molding position to another for progressive cavity molding, applying a barrier layer (e.g. oxygen scrubbing agent, etc.).

It would also be advantageous to provide structure to support pre-molding operations such as conditioning of the mold or molding inserts (e.g. heat and/or cool molding surface, apply a mold release agent, clean molding insert and vents using dry dry-ice cleaning). All such operations would require additional structure coupleable to the injection molding machine to perform one or more of these operations. Such structure would be embodied as an operative structure or tooling that is mounted to a generic transport structure for movement of the operative structure into and out-of the molding region to perform their function. However, all such additional structure will add complexity, weight, maintenance requirements, and degrade injection molding cycle time.

For example, U.S. Pat. Nos. 4,976,603; 5,518,387; and 5,709,833 disclose a so-called Servo Swing Chute ("SSC") structure whereby parts are removed from mold cavities by tooling that is mounted to a swing arm transport structure so as to swing toward and away from the mold to remove the just-molded plastic articles from the mold cavities. These SWC structures are typically mounted outboard of the mold cavities. The operation of these swinging tools requires relatively more time to extract the molded parts thereby increasing the cycle time (i.e., additional time required to open the mold wide enough to permit the large swing radius dictated by either the swing arm and/or molded article thereon).

The so-called side-entry robot/end-of-tool-arm ("EOAT") mechanism is another variety of transport structure for moving tooling across the face of the mold to perform certain post-mold operations. Such transport structure and tooling are situated outboard of the molds, typically adjacent the injection molding machine with the attendant size and weight disadvantages inherent in the fact that the tooling is of a size required to service an entire mold face (i.e. must reach across the entire face of the mold) and has a robust and relatively massive structure to accommodate the tooling over a relatively long translation stroke.

U.S. Pat. No. 5,527,173 discloses a molding apparatus including operative structure in the form of a carrier plate for receiving molded articles and holding inserts to be incorporated into the molded article, and further for transferring the inserts to the mold cores prior to molding. The carrier plate is intended for use mounted to a typical side-entry robot.

U.S. Pat. No. RE 33,237 discloses an improved carrier plate cooperating with an injection molding machine for handling hollow plastic articles from the molding cavities. Further, the structure and operation of the side-entry robot is contemplated, a suggested configuration including a platen mounted robot with pneumatically or servo driven tooling plate actuation, and with the further provision of a carrier plate to a mold alignment device.

U.S. Pat. Nos. 4,616,992, 4,679,997, and 4,784,592 are examples of known devices for placing labels in the blow molds of a blow-molding machine. The devices include a transfer assembly mounted on a side-entry robot that uses vacuum cups or grippers to transport the labels and/or blown article. However, these patents fail to disclose a sliding transport structure that can be advantageously mounted inboard of the mold.

U.S. Pat. No. 5,520,876 discloses a process and a device for injection molding plastic cups having a label-shaped enveloping sheet integrated therein. The label holder and handling device are of an integral construction, pivotably connected to the mold core half. This patents fails to disclose a sliding transport structure that can be advantageously mounted inboard of the mold.

U.S. Pat. Nos. 4,351,630 and 4,340,352 disclose a device for the in-mold closing of a lid of a cap. The device includes a finger mounted inboard of the mold which slides between the mold sections in an open position, and in the process, engages a portion of the article or the lid, rotates the portion or lid about the hinge, and snaps the lid shut. This patents fails to disclose a sliding transport structure that can be compactly mounted inboard of the mold.

Commonly assigned U.S. patent application Ser. No. 10/243,002, filed 13 Sep. 2002, and entitled "APPARATUS FOR CLOSING A HINGED MOLDED PART", discloses an apparatus and method for part removal from a mold and for the in-mold folding of a hinged molded part using a swing arm mechanism. This application does not, however, disclose a sliding transport structure that can be advantageously mounted inboard of the mold.

Thus, what is needed is a new transport structure and related tooling and/or method for performing various post-mold operations on just-molded plastic articles, which can reduce cycle time, reduce size and weight constraints, and offer great flexibility in the types of post-mold operations which can be carried out.

SUMMARY OF THE INVENTION

It is an advantage of the present invention to provide a side shuttle apparatus configured to be mounted inboard of a mold, and capable of translating across a mold face in order to position tooling thereon with respect to mold cavities/cores (or an auxiliary station (e.g. drop chute)) to perform various pre and post-mold operations, and a method of using such an apparatus, which overcomes the problems of prior art injection molding machines. The term "side" is not limiting as to the direction of movement of the shuttle structure. That is, the shuttle structure may move horizontally in horizontally-disposed molds, and may move vertically in vertically-disposed molds. Thus, the shuttle structure will move in a direction substantially parallel with the coplanar surfaces of the mold cavity and mold core faces.

According to a first aspect of the present invention, molding machine side shuttle structure and/or steps are provided whereby a shuttle plate has a portion that is always disposed inboard of a perimeter of a first mold half of the molding machine. A guidance assembly is configured to be coupled to the first mold half, and is also configured to guide the shuttle plate linearly across a molding face of the first mold half. A drive is configured to drive the shuttle plate linearly, whereby the shuttle plate is moved only linearly across the molding face of the first mold half. An operation structure is coupled to the shuttle plate and is configured to (i) remove a molded article from one of a mold core and a mold cavity, and (ii) perform a further operation on at least one of (iia) a molded article disposed in/on a mold structure of the first mold half, and (iib) the mold structure of the first mold half.

According to a second aspect of the present invention, structure and/or steps are provided whereby a molded article work piece application apparatus includes a plate configured to be coupled to a mold portion. The plate includes a work piece application device that is configured to apply a work piece to at least one of a mold core and a mold cavity. Drive structure is coupled to the mold portion, and is configured to drive the plate (i) such that the plate is driven only in one or more coplanar linear directions, and (ii) such that the work piece application device applies the work piece to the at least one of the mold core and the mold cavity.

According to a third aspect of the present invention, structure and/or steps are provided whereby molded article lid closing apparatus includes a plate configured to be coupled to a mold portion, and also includes a lid closing device that is configured to at least partially close a lid of a molded article that is resident on one of a mold core and a mold cavity. The plate also includes a molded article removal device configured to remove a molded article from one of a mold core and a mold cavity. Drive structure is configured to be coupled to the mold portion, and configured to drive the plate (i) such that the plate is driven only in one or more coplanar linear directions, and (ii) such that the lid of the molded article that is resident on one of the mold core and the mold cavity is at least partially closed.

According to a fourth aspect of the present invention, structure and/or steps are provided whereby a method of performing an operation on a molded article resident in at least one of a mold cavity and a mold core in a molding machine, includes the steps of: (i) opening at least one of a mold cavity plate and a mold core plate to expose the molded article; (ii) moving a shuttle member only in one or more linear coplanar directions across a face of at least one of the mold cavity plate and the mold core plate to a position to access the molded article; (iii) performing an operation on the molded article while it is at least partially resident in the at least one of the mold cavity and the mold core; (iv) moving the shuttle member only in one or more linear coplanar directions from the molded article access position to a park position where at least a portion of the shuttle member is within a perimeter of at least one of the mold cavity plate and the mold core plate; and (v) closing the at least one of the mold cavity plate and the mold core plate while said at least a portion of the shuttle member is within the perimeter of the at least one of the mold cavity plate and the mold core plate.

BRIEF DESCRIPTION OF THE DRAWINGS

The advantageous structure and/or function according to the present invention will be more easily understood from the following detailed description of the preferred embodiments and the appended Drawings, as follows.

DETAILED DESCRIPTION OF THE PRESENTLY PREFERRED EXEMPLARY EMBODIMENTS

1. Introduction

Figure 1:
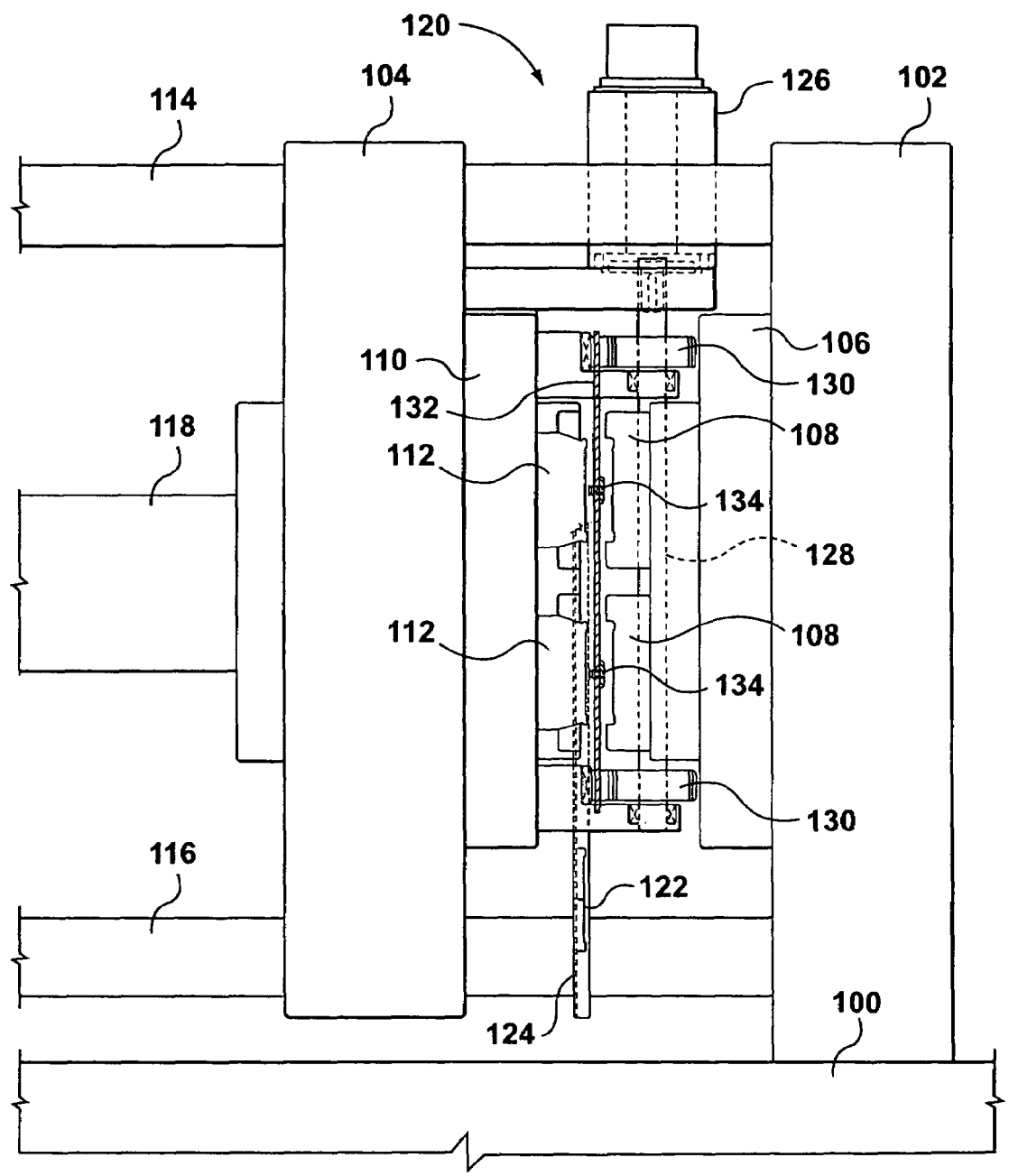
FIG. 1 is a schematic side view of an injection molding machine in which a servo side shuttle according to the present invention may be used.

The present invention will now be described with respect to embodiments in which a plastic injection molding machine includes a mold with an inboard-mounted side shuttle for numerous in-mold operations including finished molded article handling. These molding operations could be carried out in single face molds, stack molds, three and four level molds, etc. Indeed the present invention may find applicability in the molding operations in other kinds of molding such as stamping, die-cast, metal molding, etc., or anywhere efficient molded-part handling structures would be beneficial.

As a brief overview to assist in understanding the following detailed disclosure, the preferred embodiments include a shuttle plate connected to a first mold half by a guidance assembly for guiding the shuttle plate linearly across the molding face of the first mold half. The shuttle plate is driven by an appropriate motive means. The shuttle plate includes operations structure which can carry out various operations on the just-molded parts while those parts are still present in their respective cavities or on their respective mold cores, or operations on the mold cavities or cores before or after the liquid plastic has been injected into the cavities. For example, the shuttle plate could include suction cups which are used to extract the molded part from its mold core, move the molded part linearly, and drop the part into a drop chute. Likewise, the operations structure can insert a label into the mold cavity before the plastic is injected therein, and/or close the lid of a molded article that is resident on the mold core.

The shuttle plate is preferably disposed inboard of the mold half so that a small machine footprint is provided, and the shuttle plate may have a shorter distance to move. This results in a lighter weight and compact design that can be operated more quickly and hence reduces cycle time.

The servo side shuttle ("SSS") is configured to translate its tooling across the face of the mold (i.e. linear motion). The preferred in-board installation and related short stroke of the servo side shuttle provides for a compact and relatively light weight design that again permits faster cycling and/or permits handling of higher cavitation molds at a lower cost relative to SSC and side-entry robot/EOAT tools. Further, the preferred inboard side shuttle installation provides for improved tooling to mold cavity alignment for the sake of part handling and/or work-piece inserting (i.e. no losses due to robot to machine and/or mold to machine alignment).

Three embodiments of the present invention will now be described with respect to FIGS. 1-16, 17-20, and 21-23. FIGS. 2-16 show the servo side shuttle structure used to remove molded plastic articles from the mold, FIGS. 17-20 depict that structure used to close a lid on a molded plastic article and to remove it from the mold, and FIGS. 21-23 detail that structure used to place a label in a mold cavity for subsequent placement on a molded plastic article. However, the shuttle mechanisms described herein may be used for other in-mold operations such as inserting other molded or non-molded structures, plastic, composite, or metal into mold cavities or cores before, during, or after injection molding operations have been carried out, conducting part inspection using a vision system, in-mold decoration (e.g. priming, painting), pre-molding operations such as conditioning of the mold or molding inserts (e.g. heat and/or cool molding surface, apply a mold release agent, clean molding insert and vents using dry dry-ice cleaning, transfer molded articles from one molding position to another for progressive cavity molding, applying a barrier layer (e.g. oxygen scrubbing agent), trimming or cutting the molded article, etc. Furthermore, any and all of the above described operations may be carried out in any combination and in any sequence in order to mold and handle parts in a desired way.

2. The Structure of the Molded Article Handling Tooling

FIG. 1 shows an injection molding machine comprising a base 100 which contains the various motors and controls necessary for operating the principal parts of the machine (not shown). A first platen 102 supports a mold cavity half comprising a plurality of mold cavities 108 mounted on mold cavity plate 106. A second platen 104 supports a mold core half comprising a plurality of mold cores 112 mounted on mold core plate 110. The second platen 104 is slidably supported on upper and lower tie bars 114 and 116, and is moved reciprocally along the tie rods by a column 118. Depending upon the particular injection molding machine configuration, the first platen 102 may be stationary or it may be movable. A servo side shuttle tool 120 according to the present invention is disposed on one of the mold core plate 110 and the mold cavity plate 106. The shuttle tool 120 removes molded parts 122 from one of the mold cores 112 and the mold cavities 108 and deposits them in the drop chute 124. The servo side shuttle tool preferably includes a servo motor 126, a drive shaft 128, linear/rack mechanisms 130, shuttle plate 132, and suction members 134.

Figure 2:
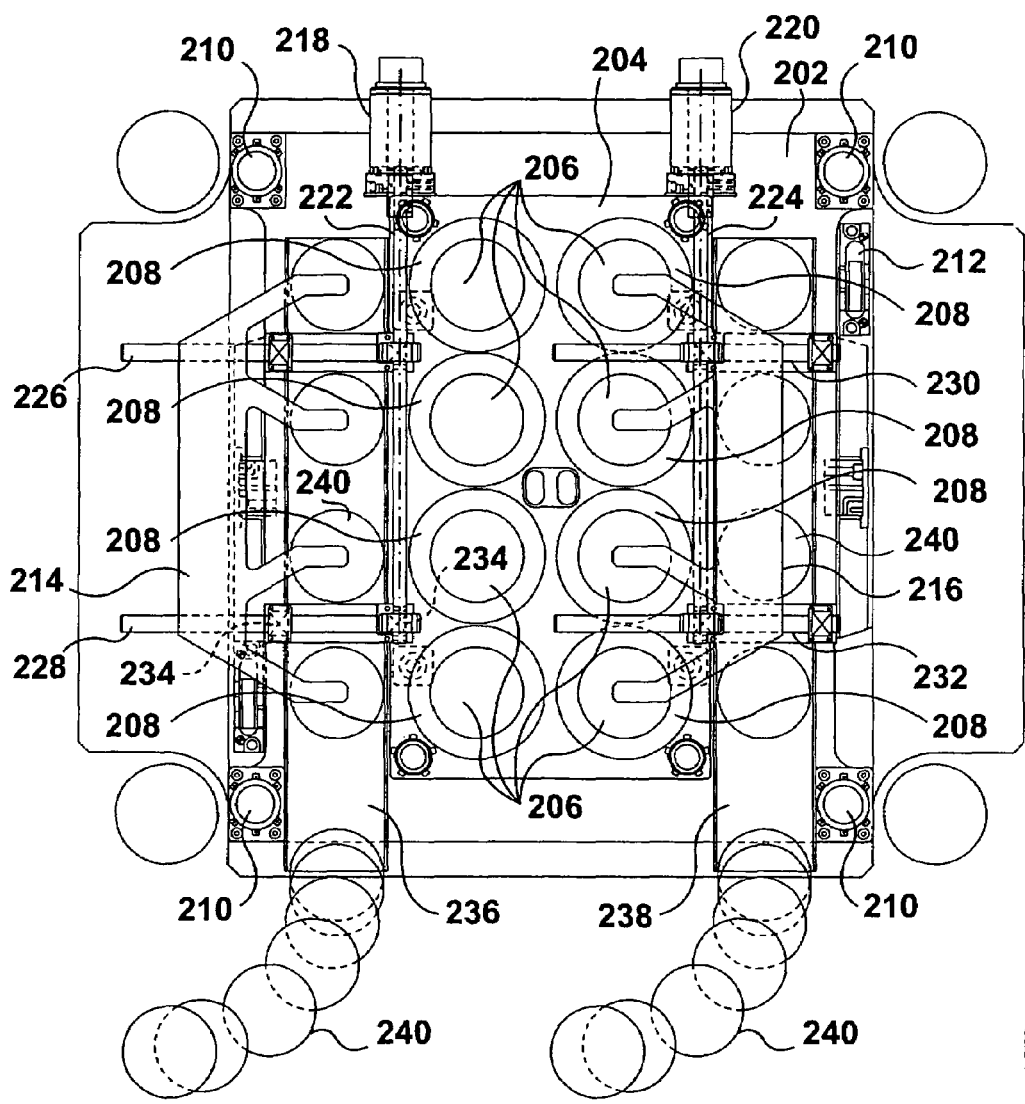
FIG. 2 is a plan view of a first embodiment of the servo side shuttle according to the present invention.

FIG. 2 is a plan view of an embodiment which is used to injection-mold plastic lids in a 4-level mold. The core plate 202 has a molding area 204 with eight mold cores 206. Stripper rings 208 surround the cores 206 and strip the molded articles off of the cores 206 in a manner to be described below. Support leader pins 210 are used to align the mold core half 202 with the mold cavity half (not shown). Harmonic linkage 212 is used to open several molds in a stack-mold configuration at the same time.

Shuttle plates 214 and 216 are disposed, respectively, on the left side and right side of the core plate 202. Each shuttle plate has four arms configured to extend over and cover corresponding ones of the cores 206. For illustration purposes only, the left side of FIG. 2 shows the shuttle plate 214 in the outboard or closed position, and the right side of FIG. 2 shows the shuttle plate 216 in the inboard or open position. In the outboard position, a portion of the shuttle plate extends outside of the perimeter of the core plate 202, while in the inboard position the shuttle plate is entirely within the core plate perimeter. Nevertheless, in both the mold open position and in the mold closed position, at least a portion of the shuttle plate is disposed within the perimeter of the core plate, as shown in FIG. 2. Of course, each shuttle plate may comprise one or more planar members, rectangular cross-section members, circular cross-section members, wires, cables, articulated members, and be made of metals, plastics, composites, etc.

Servo motors 218 and 220 respectively drive the shuttle plates 214 and 216 through respective drive shafts 222,224, and rack/linear rails 226,228 and 230,232. The servo motors 218 and 220, the drive shafts 222,224, and the rack/linear rails 226,228 and 230,232 are preferably coupled to the core plate and/or the cavity plate. Each rack/linear rail preferably includes one or more linear bearings 234, and is configured and disposed to guide the shuttle plate with a linear motion with respect to a mold surface of the core plate. Of course, any convenient drive/guidance structure may be adapted for use in driving the shuttle plates.

Each shuttle is driven linearly across the face of the core plate (and/or the cavity plate) between the inboard/open position (also called the pick position) where it picks the molded article from the core, and an outboard or open position (also called the drop position) where it drops the molded articles into drop chutes 236 and 238. In FIG. 2, numerous molded parts 240 are shown attached to shuttle plate 214, inside the drop chute 238, and exiting from both of the drop chutes 236 and 238. The servo motors may be replaced/augmented by other drive mechanism such as mechanical drives, pneumatic drives, hydraulic drives, or drives coupled to the movement of the mold halves as they open and close. Also, the shuttle mechanism may be used to perform any desired operation on the molded article while the molded article is fully or partially resident on the mold core or the mold cavity. For example, a label may be applied to the exterior surface of a just-molded plastic container while that container is partially extracted from the mold cavity.

Figure 3:
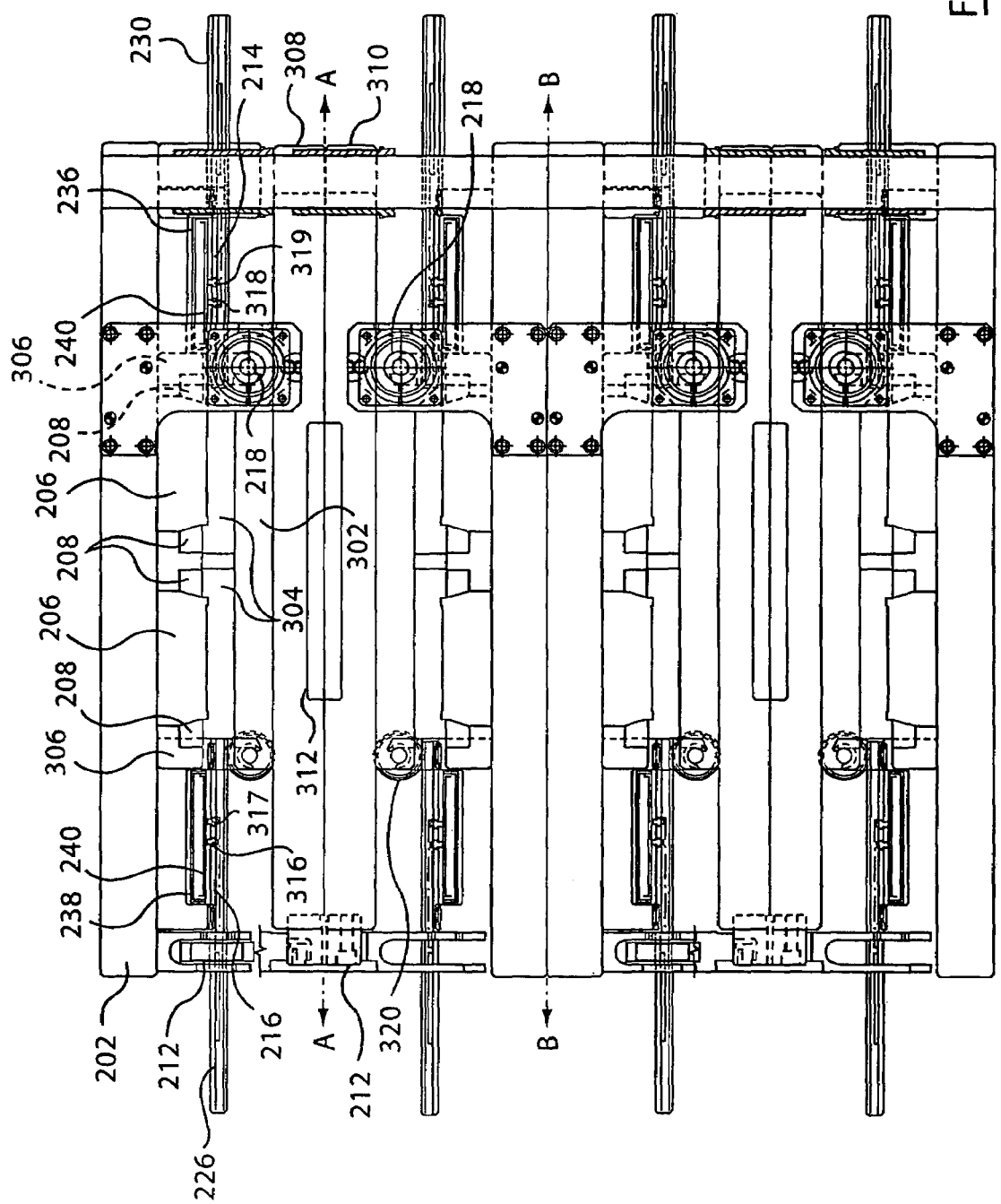
FIG. 3 is a top view of the first embodiment of the present invention.

FIG. 3 is a top view of the FIG. 2 embodiment showing the molds in the 4-level mold in the closed position. A core plate 202 holds cores 206, while a cavity plate 302 has cavities 304. Parts 240 are shown in their outboard positions while fresh parts 240 are being formed between the cores 206 and the cavities 304. A stripper plate 306 has stripper rings 208 which strip the parts 240 from the cores 206 when the core plate 202 is moved away from the cavity plate 302 by the mold opening structure. A first hot runner plate 308 and a second hot runner plate 310 hold a hot runner 312 in a known manner. Each of the pick positions on the shuttle plates 214 and 216 includes two suction cups 316,317 and 318,319, respectively. These suction cups are used to grasp the parts 240 from the cores 206. However, numerous equivalents to the suction cups may be used such as vacuum channels, mechanical grippers, adhesive layers, electrostatic attraction/repulsion, magnetic attraction/repulsion, etc.

The shuttle plates 214 and 216 are driven by the servomotors 218 and 222 to move linearly between the cores 206 and the drop chutes 236,238. Once positioned in the drop chutes, a vacuum is released and/or an interfering tab is disposed to drop the parts 240 into the drop chutes. Drive gears 320 are used to transmit the motion from drive shafts 222,224 to the rack/linear rails 226,228 and 230,232, respectively. In FIG. 3, a first mold section and a second mold section are symmetrical about line A-A, and the details of the second mold section will not be further described. Likewise, a first mold group and a second mold group are symmetrical about a line B-B, and the details of the second mold group will not be further described.

Figure 4:
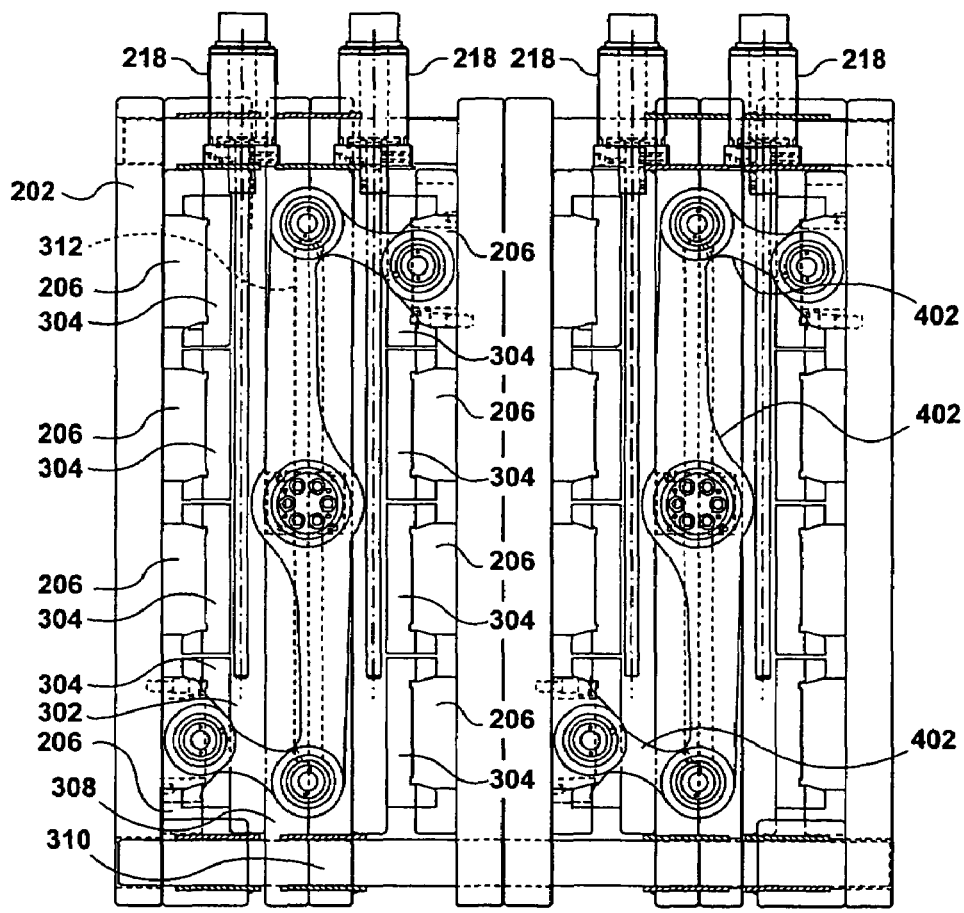
FIG. 4 is a side view of the first embodiment of the present invention.

FIG. 4 is a side view of the FIG. 2 embodiment showing the mold halves in the closed position. The figure shows the servo motors 218, the core plate 202, the cores 206, the cavity plate 302, the hot runner plates 308,310, and the hot runner 312. Secondary harmonic linkages 402 are used transfer motion among the several pairs of mold core/cavity plates to ensure properly timed opening/closing of the mold plates.

Figure 5:
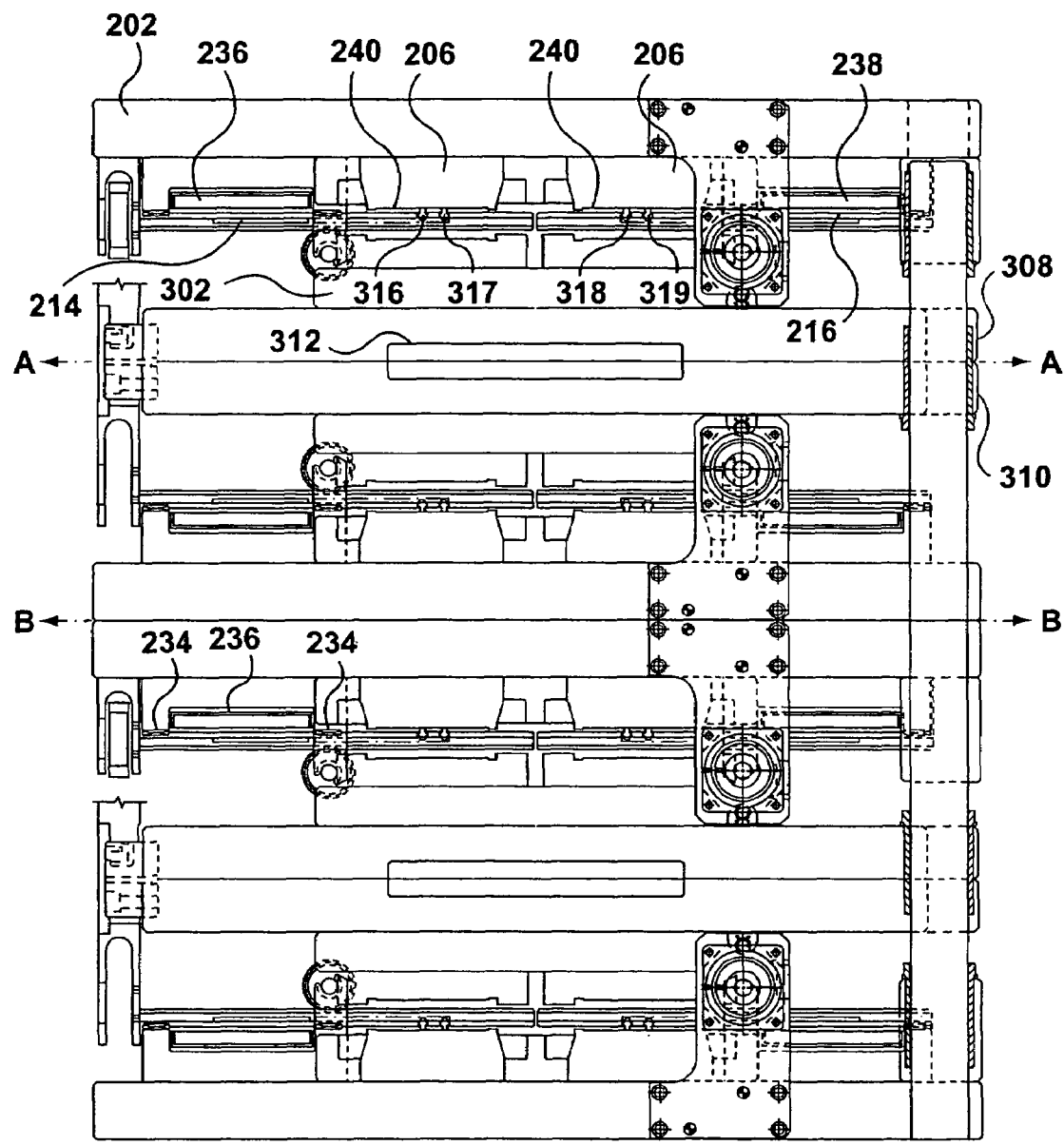
FIG. 5 is another top view of the first embodiment of the present invention.

FIG. 5 is a top view of the FIG. 2 embodiment showing the mold halves in the open position. In this position, the shuttle plates 214,216 move inboard to a position where their suction cups 316,317 and 318,319 can grasp parts 240 from the cores 206. Note the thin clearance (e.g. ~50 mm) between the open core plate 202 and the cavity plate 302. The rack/linear rail structures 226, 228 and 230,232, and the shuttle plates 214, 216 are configured to move within this narrow clearance to pick the parts 240 from the cores 206, retract to the drop position, and then drop the parts 240 into the drop chutes 236,238. This narrow clearance means that the mold halves do not have to open very much to effect part removal. FIG. 5 also shows that the linear bearings 234 are widely disposed on opposite sides of the drop chute 236, thus providing wide linear bearing support for the rack/linear rail 228.

Figure 6:
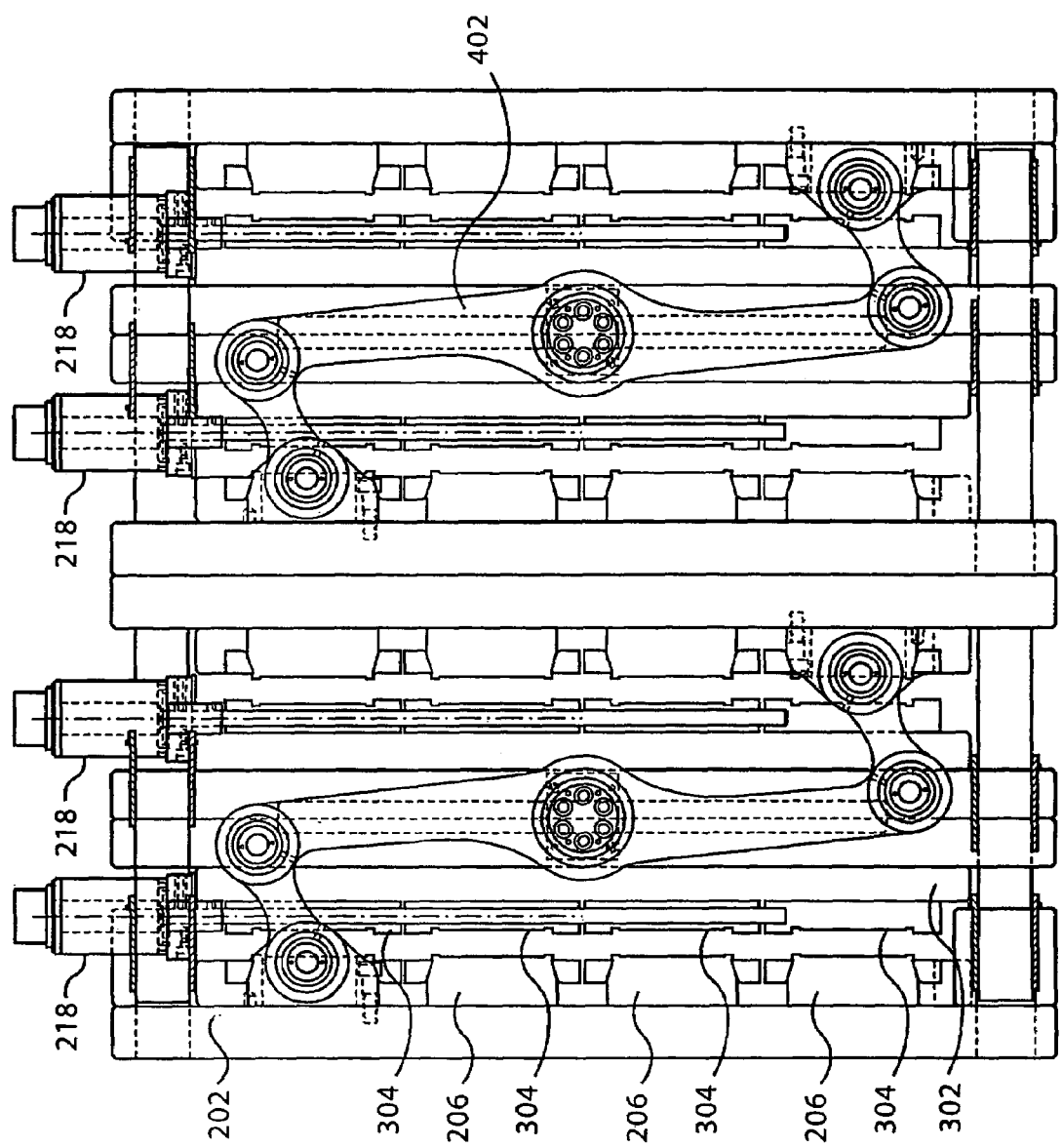
FIG. 6 is another side view of the first embodiment of the present invention.

FIG. 6 is a side view of the FIG. 2 embodiment showing the core plate 202 and the cavity plate 302 in the open position.

Figure 7:
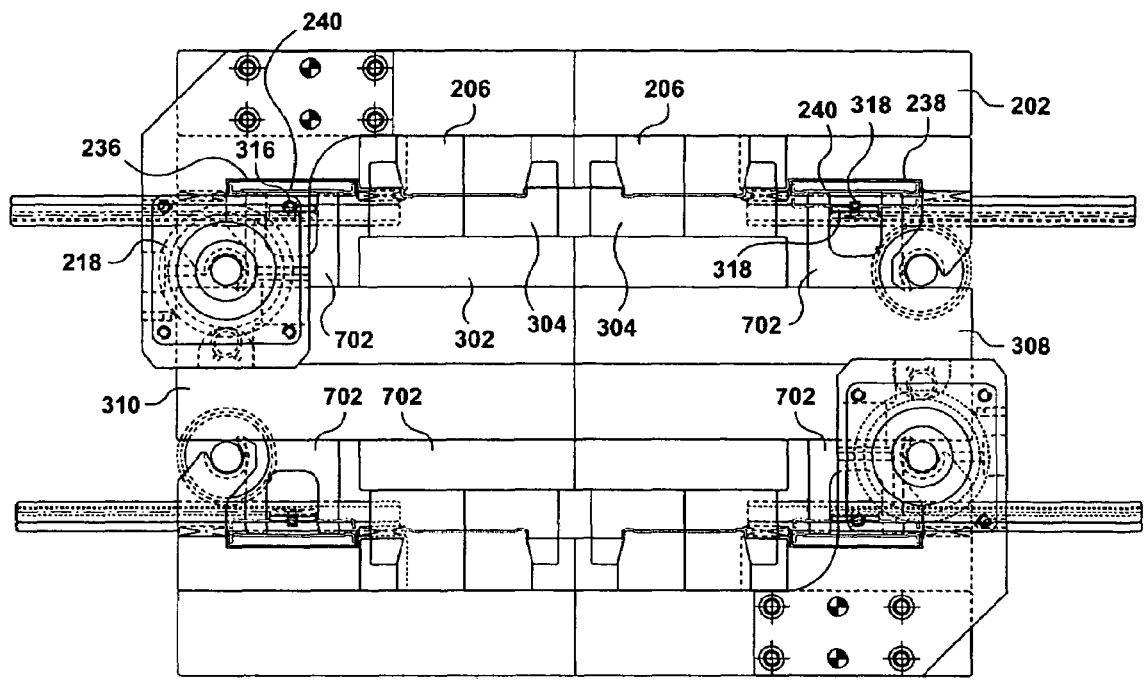
FIG. 7 is a top view of an alternative of the first embodiment of the present invention.

FIG. 7 shows an alternative to the FIG. 2 embodiment in a stack mold in which a U-shaped stripper bar 702 (a part of the mold) is used to strip the parts 240 from the shuttle plate suction cups 316,318 into the drop chutes 236,238. The stripper bar 702 may obviate the need for any vacuum channels and vacuum control structure to remove the parts 240 from the suction cups. The stripper bars 702 further forms a part of drop chutes 236,238 when the mold is closed and is configured to guide the parts in the chute and hence eliminates possible interference between falling parts and the suction cups.

Figure 8:
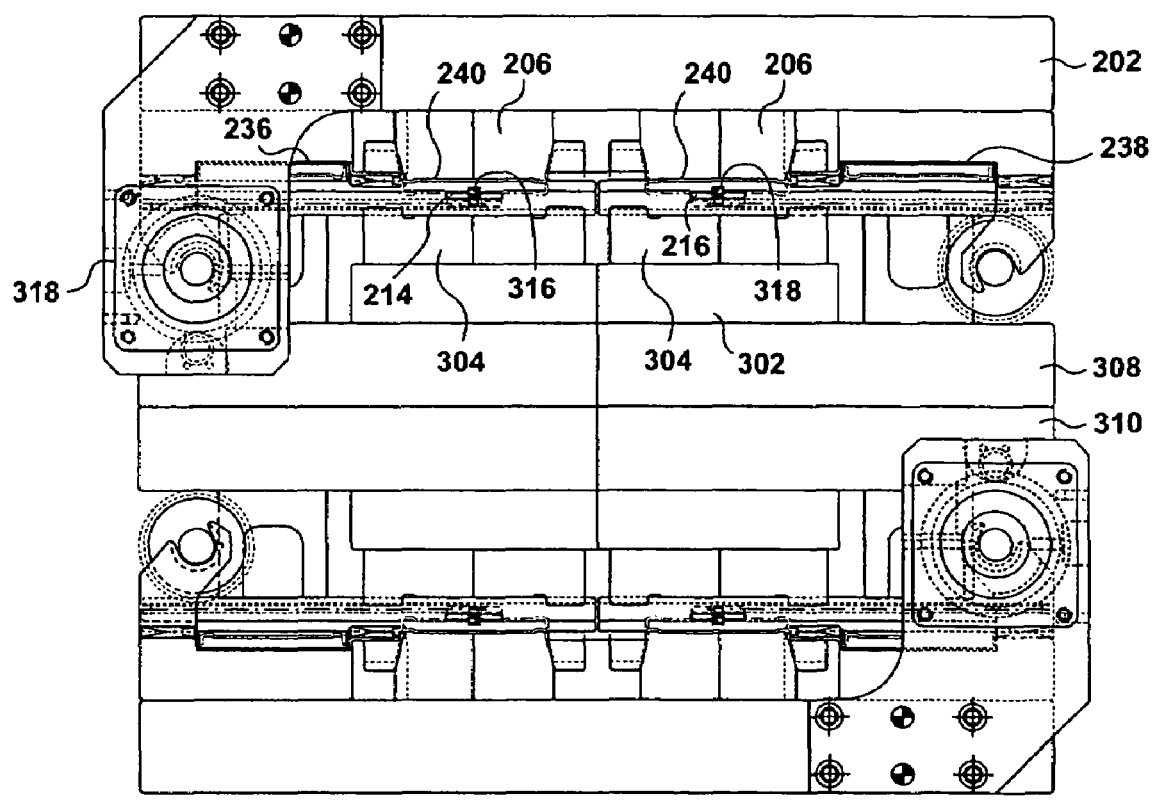
FIG. 8 is a top view of the FIG. 7 alternative.

FIG. 8 shows the FIG. 7 alternative in the open position. The shuttle plates 214,216 have been driven inboard to position their suction cups 316,318 adjacent the parts 240 in preparation for picking the parts 240 from the cores 206.

Figure 9:
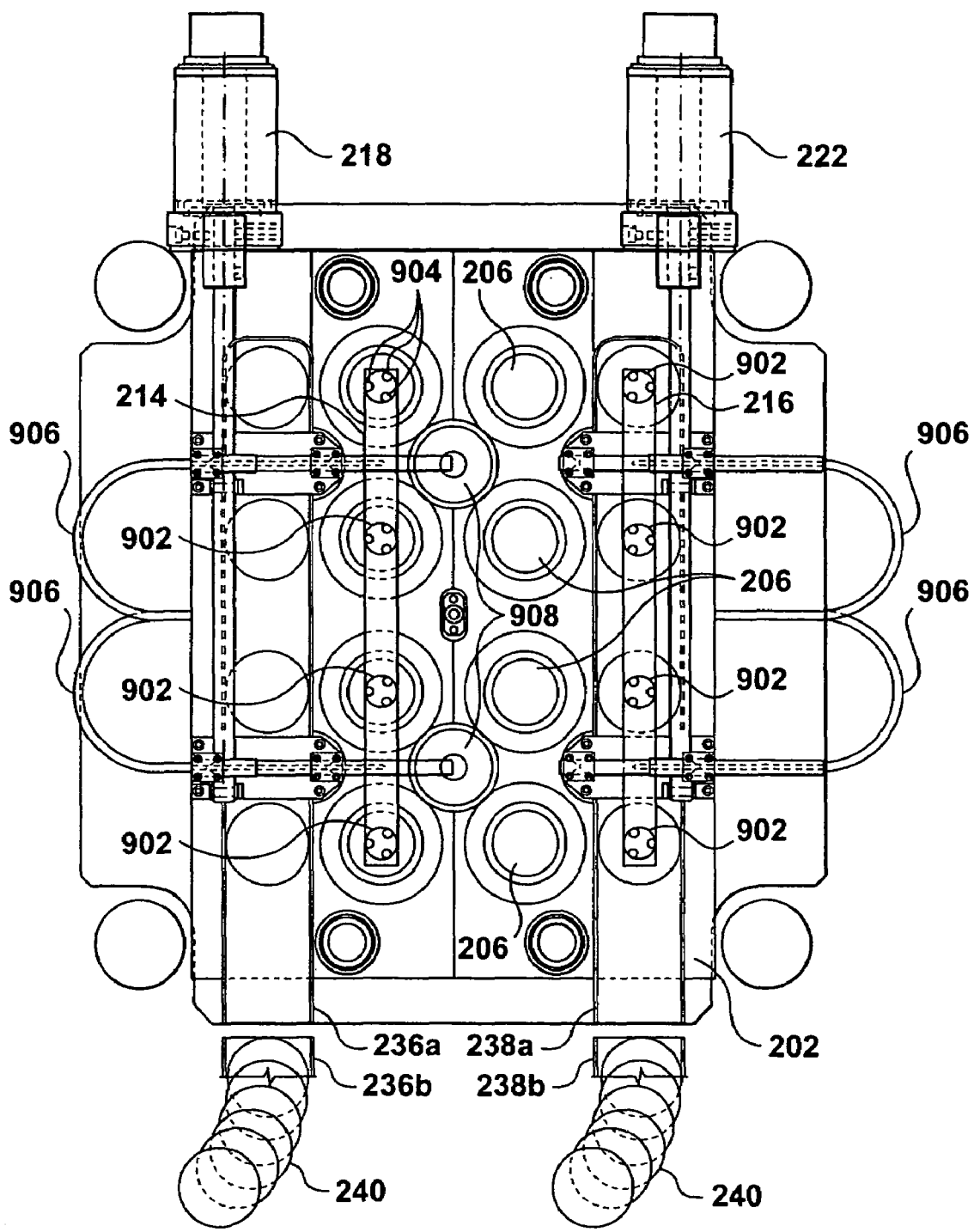
FIG. 9 is a plan view of the core plate in another alternative the first embodiment of the present invention.

FIG. 9 is a plan view of the core plate 202 in another alternative of the FIG. 2 embodiment. In this alternative, shuttle plates 214,216 comprise relatively narrow rectangular plates, each of which holds four vacuum plates 902. Each vacuum plate 902 has three vacuum ports 904 therein for grasping the parts 240 by a vacuum force. Vacuum tubes 906 carry lower pressure air to the vacuum ports 904. A vacuum source (not shown) and control structure (e.g., a processor, solenoids, etc.) manage the vacuum in order to grasp and release the parts 240, as required. Stripper plate pistons 908 move the stripper plate in a known manner to strip the parts 240 from the cores 206. In this alternative, each of the drop chutes 236,238 has a movable portion 236a,238a that moves with the core plate 202, and a stationary portion 236b,238b that remains fixed with respect to the core plate 202.

Figure 10:
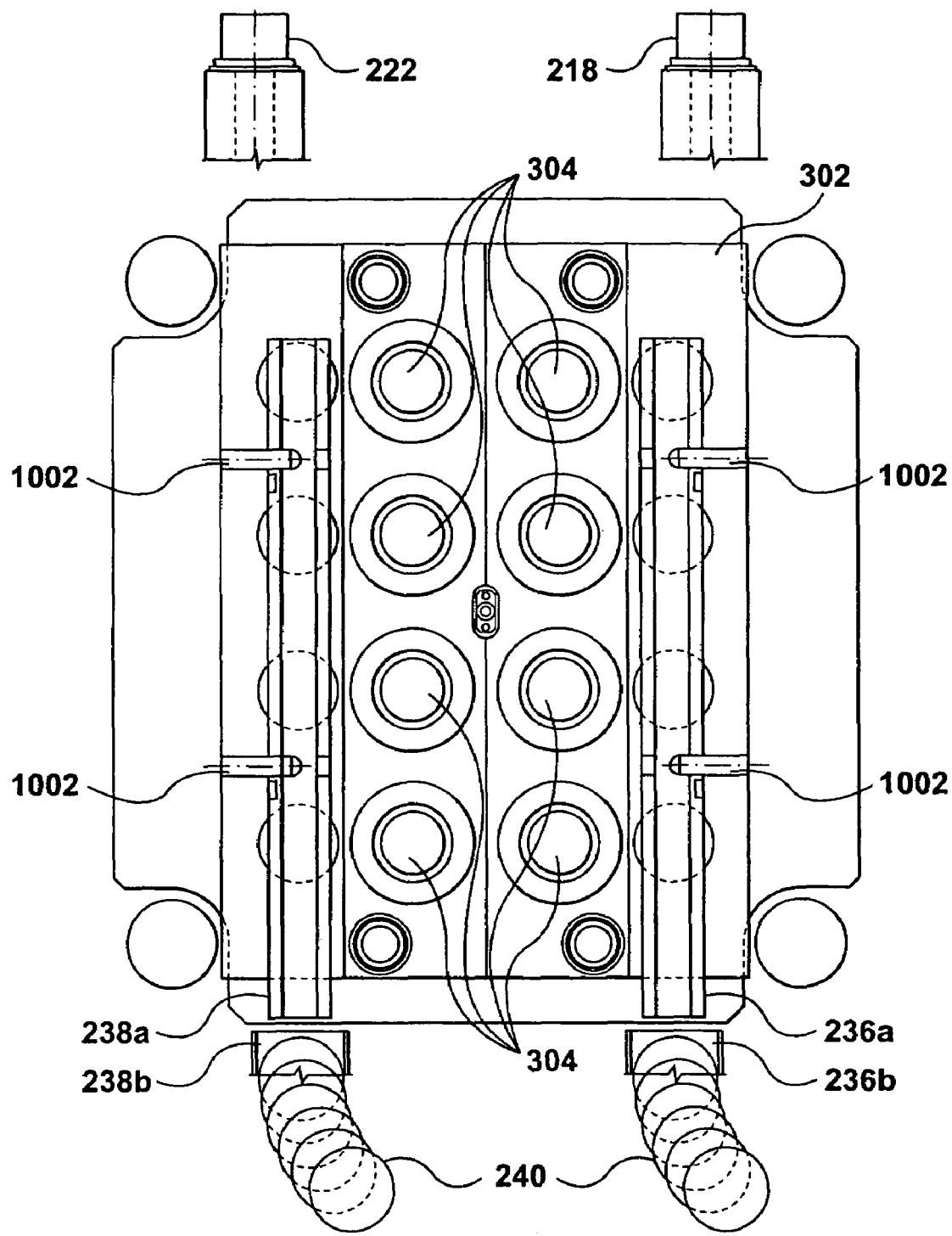
FIG. 10 is a plan view of the cavity plate of the FIG. 9 alternative.

FIG. 10 is a plan view of the cavity plate 302 in the FIG. 9 alternative. Note the cut-outs 1002 which form spaces for the gears of the shuttle plate drive mechanism to park when the mold halves are closed.

Figure 11:
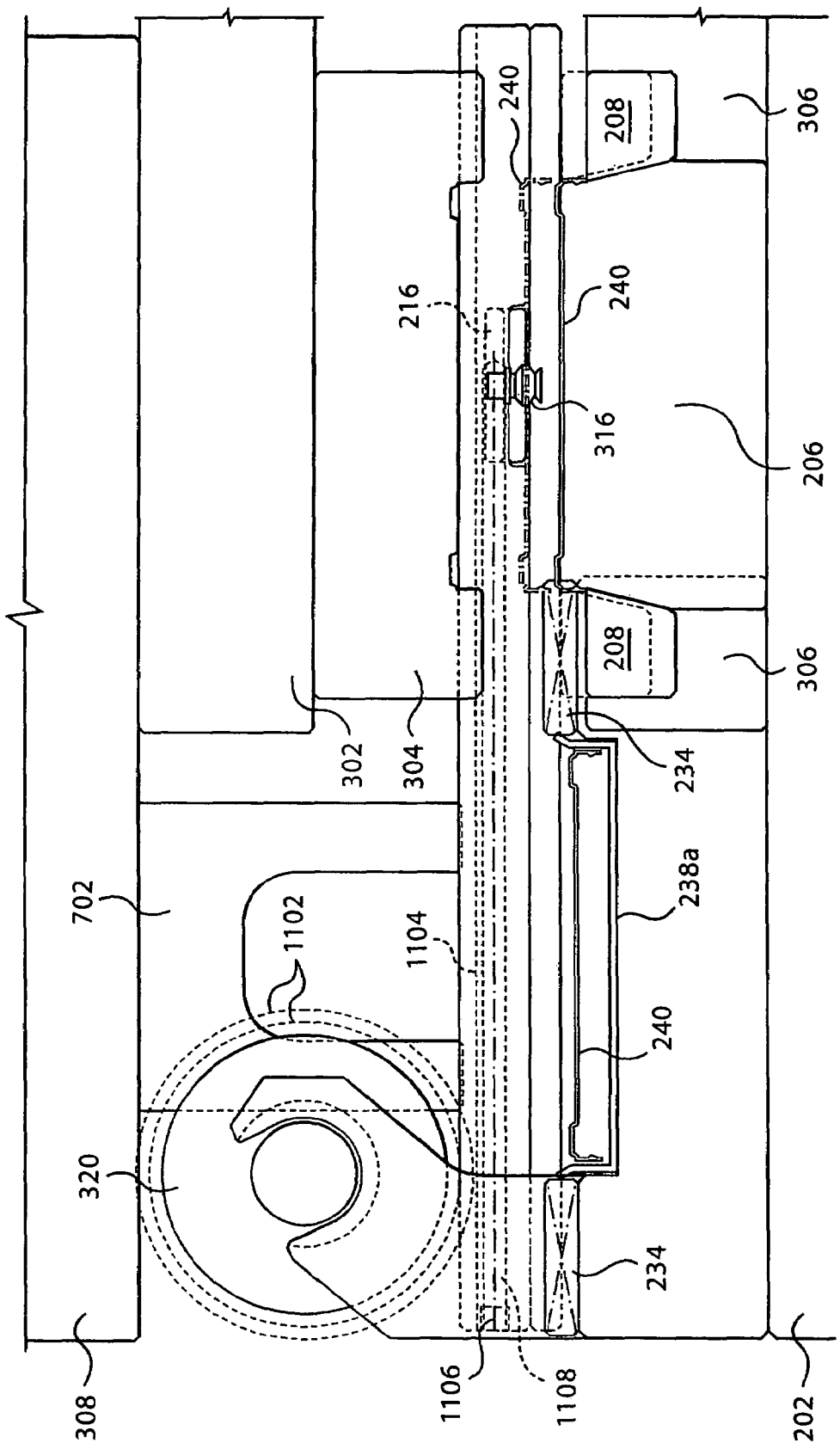
FIG. 11 is a drop detail view of the FIG. 9 alternative.

FIG. 11 is a close-up view of the drop details of the FIG. 9 alternative, showing the mold halves in the open position. The hot runner plate is adjacent the cavity plate 302, which holds the cavity 304. The core plate 202 holds the core 206 and is moved relative to the cavity plate 302. The stripper plate 306 moves the stripper ring 208, which is shown in the figure in its mold-closed position (solid line) and its mold-open position (dashed line). The shuttle plate 216 moves from left to right to position its vacuum ports 904 to grasp part 240 to be stripped from the core 240 by stripper ring 208 when the mold halves are open, the shuttle plate 216 (with part 240 attached) moves from right to left (supported by bearings 234) to a position above the drop chute 238a, and the mold halves again close (to mold the plastic part), the mold closing action causing stripper bar 702 to strip the part 240 from the suction cup 316 and drop into the drop chute 238a. The dashed lines 1102 and 1104 represent the outer limits of the gears which drive the shuttle plate 216. Dashed line 1106 represents a vacuum tube fitting, and dashed line 1108 represents the vacuum tubes that are conduits to the suction cups 316.

Figure 12:
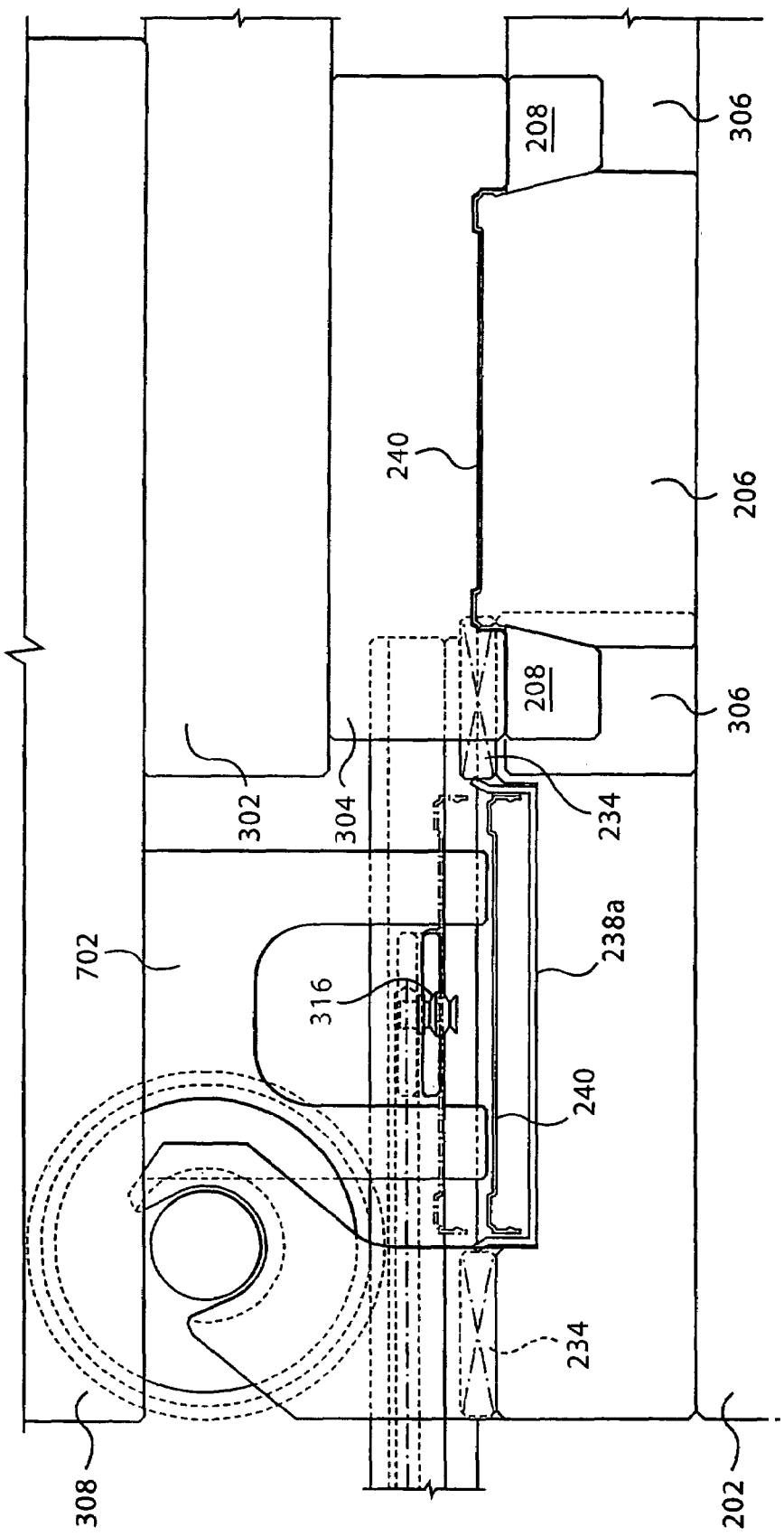
FIG. 12 is another drop detail view of the FIG. 9 alternative.

FIG. 12 is a close-up view of the drop details of the FIG. 9 alternative, showing the mold halves in the closed position. This figure clearly depicts how the stripper bar 702 pushes the part 240 from the shuttle plate suction cups 316, and drops it into the drop chute 238a. Note how the stripper bar 702 forms a portion of the drop chute to keep the parts 240 properly positioned in the drop chute 238a as they descend through the chute. Note also how the shuttle plate mechanisms fit well within the vertical clearance between the mold halves.

Figure 13:
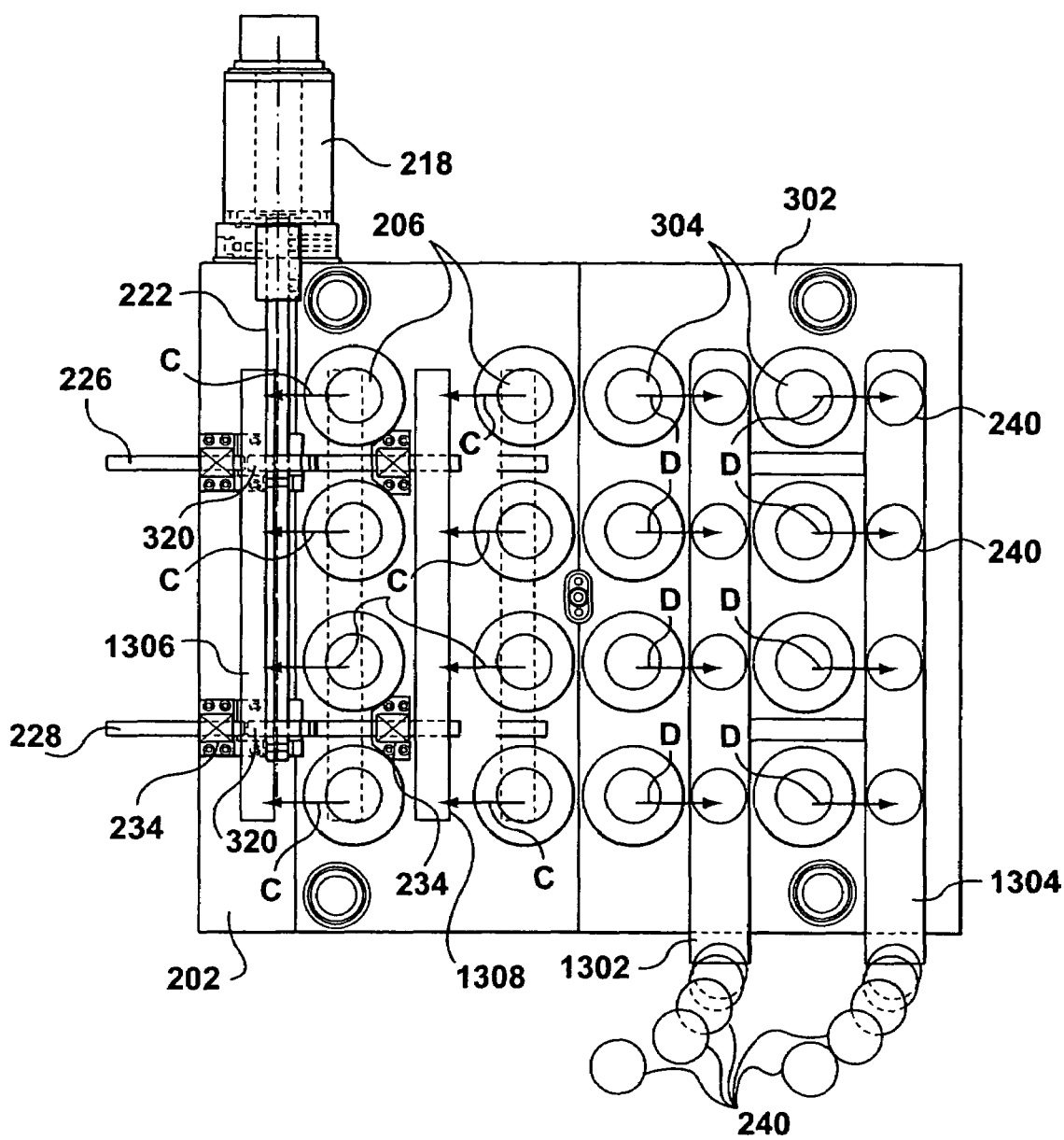
FIG. 13 is a combined core and cavity plan view schematic of another alternative of the first embodiment of the present invention.

FIG. 13 of another alternative of the FIG. 2 embodiment. For illustration purposes only, the left half of FIG. 13 shows a core plan view illustrating the part 240 transfer to the side shuttle 1306, 1308, and the right half of FIG. 13 is that of the cavity plan illustrating the part 240 transfer to the drop chutes 1302, 1304. In this alternative, each servo motor drives two shuttle plates, and thus serves two columns of cores. Of course, this alternative may be extended so that each servo motor may drive three or more shuttle plates. This alternative also allows two of the shuttle plates to be disposed inboard of the drop chutes and the cavities.

In more detail, the cavity plate 302 includes sixteen cavities 304 and four drop chutes (only the drop chutes 1302 and 1304 are shown for clarity). Four shuttle plates are provided (again, only the shuttle plates 1306 and 1308 are shown for clarity), one shuttle plate for each column of cavities. Servo motor 218 drives both of the shuttle plates 1306,1308 through the drive shaft 222, the rack/linear rails 226,228, and the gears 320. The shuttle plates 1306,1308 are driven simultaneously in the direction of the black arrows C to drop the parts 240 into the two corresponding drop chutes. In a similar fashion, an unshown servo motor moves the other two shuttle plates in the direction of arrows D to drop the parts 240 into the drop chutes 1302,1304.

Figure 14:
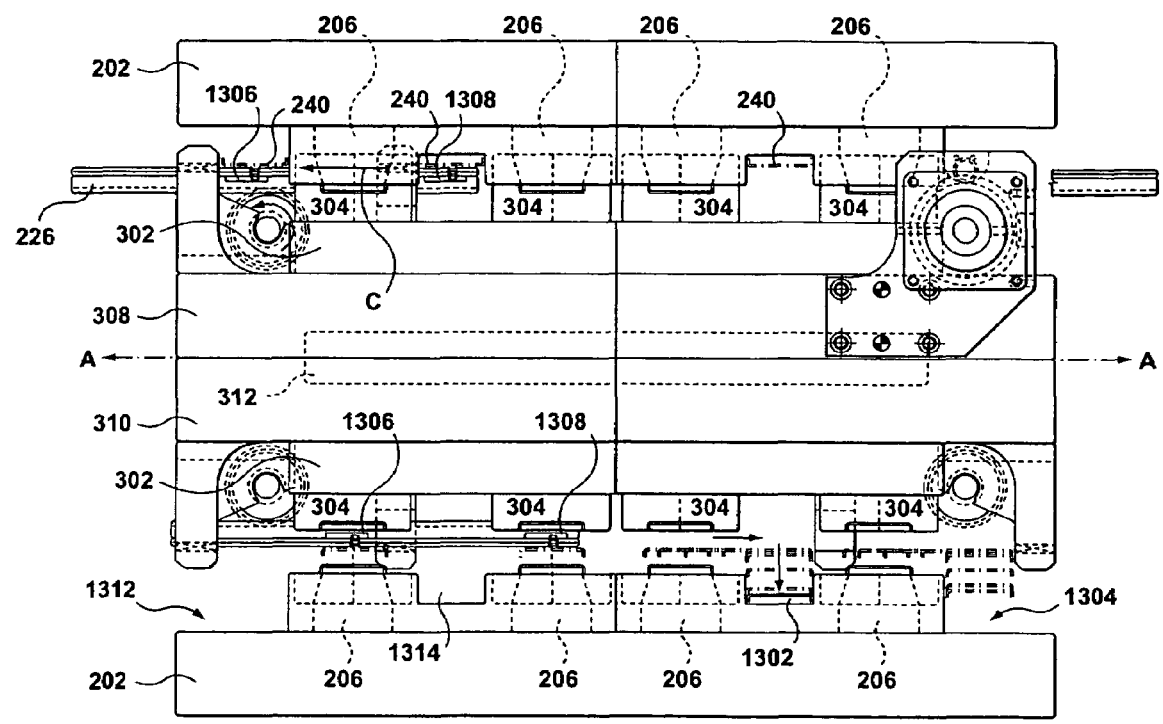
FIG. 14 is a top view of the FIG. 13 alternative.

FIG. 14 is a top view of the FIG. 13 embodiment. In the bottom half of the figure, the mold halves are shown in the open position, and four drop chutes 1302,1304,1312, and 1314 are shown. The shuttle plates 1306,1308 move horizontally between their respective pick positions to their respective drop positions to drop the parts 240 into the drop chutes. In the top half of the figure, for illustrative purposes only, the mold halves are shown in their closed position. Note how the core half and the cavity half have cut-out portions for the shuttle plates and their drive mechanisms to park while the mold halves are closed.

Figure 15:
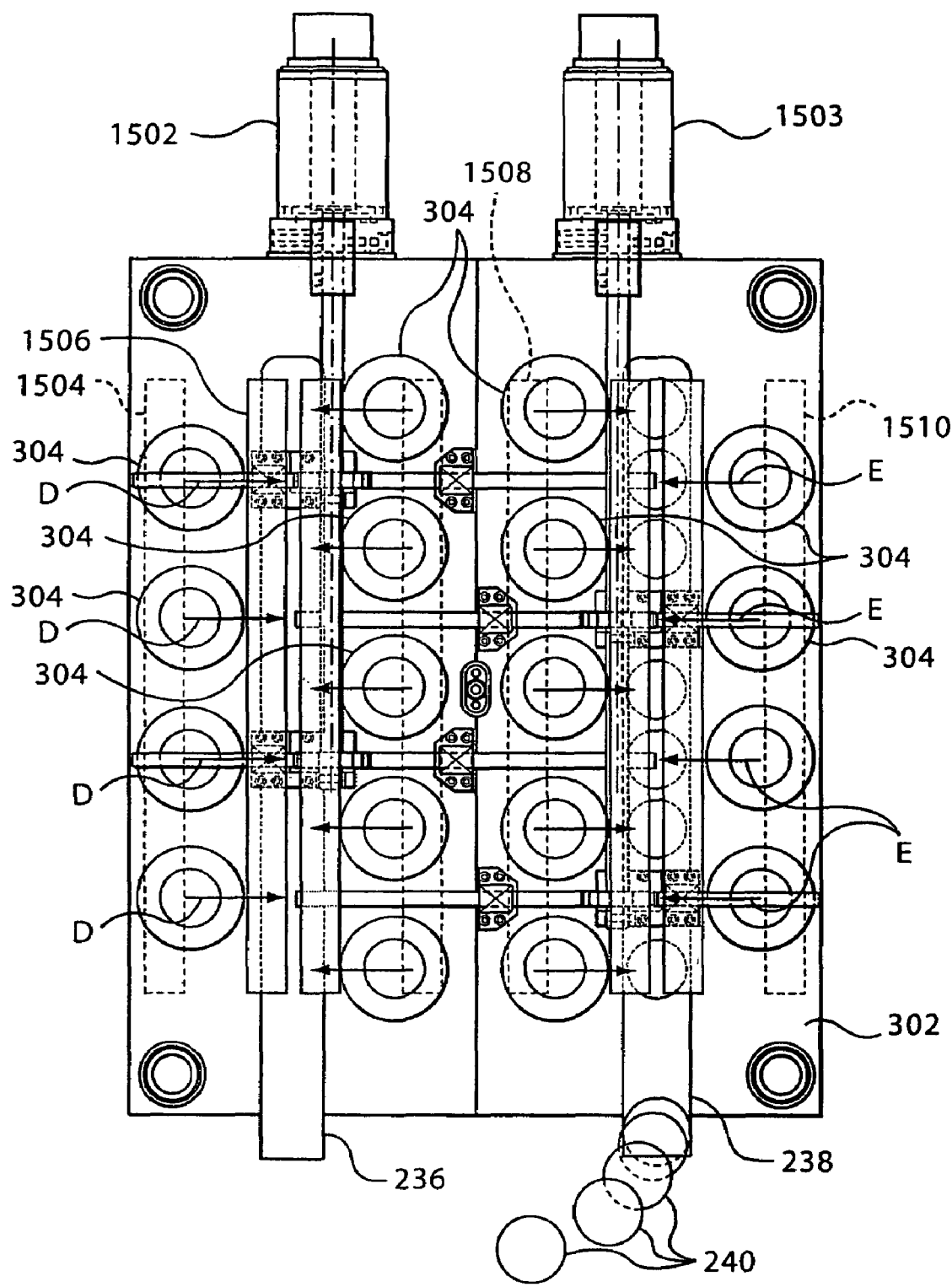
FIG. 15 is a plan view of yet another alternative of the first embodiment of the present invention.

FIG. 15 is a top view of yet another alternative of the FIG. 2 embodiment. In this alternative, the stacks of cavities are offset or staggered to allow adjacent rows of parts 240 to be transferred to a common drop chute 236, 238 minimizing the mold size and thereby to conserve machine space and further reduce the machine footprint. A servo motor 1502 drives shuttle plates 1504 and 1508 in the direction of arrows D, while servo motor 1503 drives shuttle plates 1506 and 1510 in the direction of arrows E.

The driving of the servo motors 1502 and 1503 is synchronized so that the parts 240 from alternate columns of cavities are dropped into the same drop chute. This way, only two drop chutes 236,238 are required to evacuate the parts 240 from four columns of cavities or cores. This is called "compressing" four rows of cavities into two rows of output. Note that this configuration allows all of the rack/linear rail structure to be disposed within the periphery of the cavity plate 302.

Figure 16:
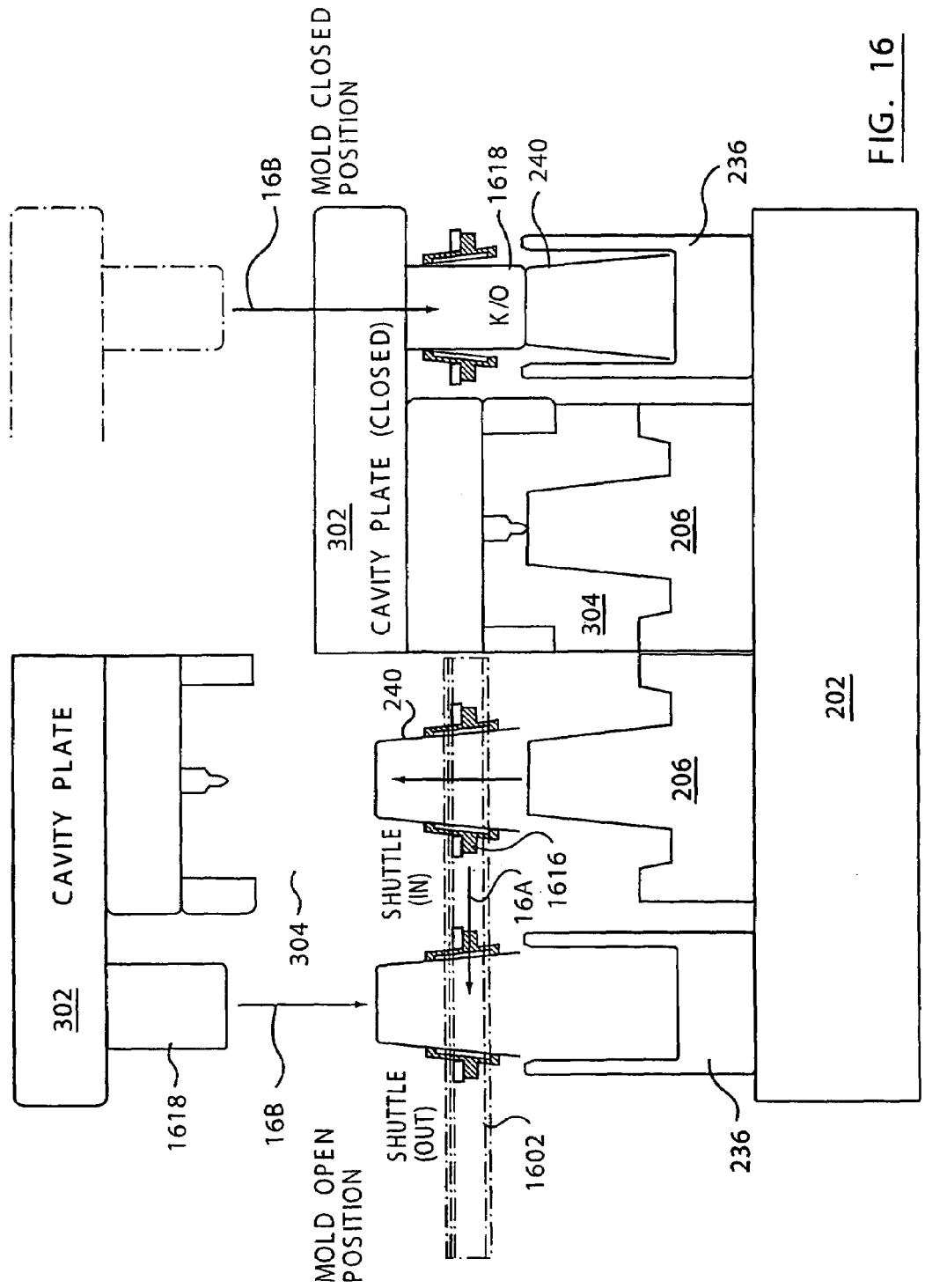
FIG. 16 is a schematic plan view of a close-up of another alternative of the first embodiment of the present invention.

FIG. 16 is a side view of another alternative of the FIG. 2 embodiment for handling a part with a relatively long shallow draft (e.g. cup). The shuttle plate 1602 includes a jig 1616 which receives and traps the molded part 240, either during a mold close stroke or propelled by the stripper ring (not shown). The shuttle plate 1602 then moves the jig 1616 in the direction of arrow 16A, where it is positioned above the drop chute 236. The mold closing stroke (or an intermediate stroke) causes a knockout mandrel 1618 to engage the molded part 240, thereby releasing the part 240 into the drop chute 236, as indicated by the arrows 16B.

3. The Structure of the Lid-Closing Tooling

Figure 17:
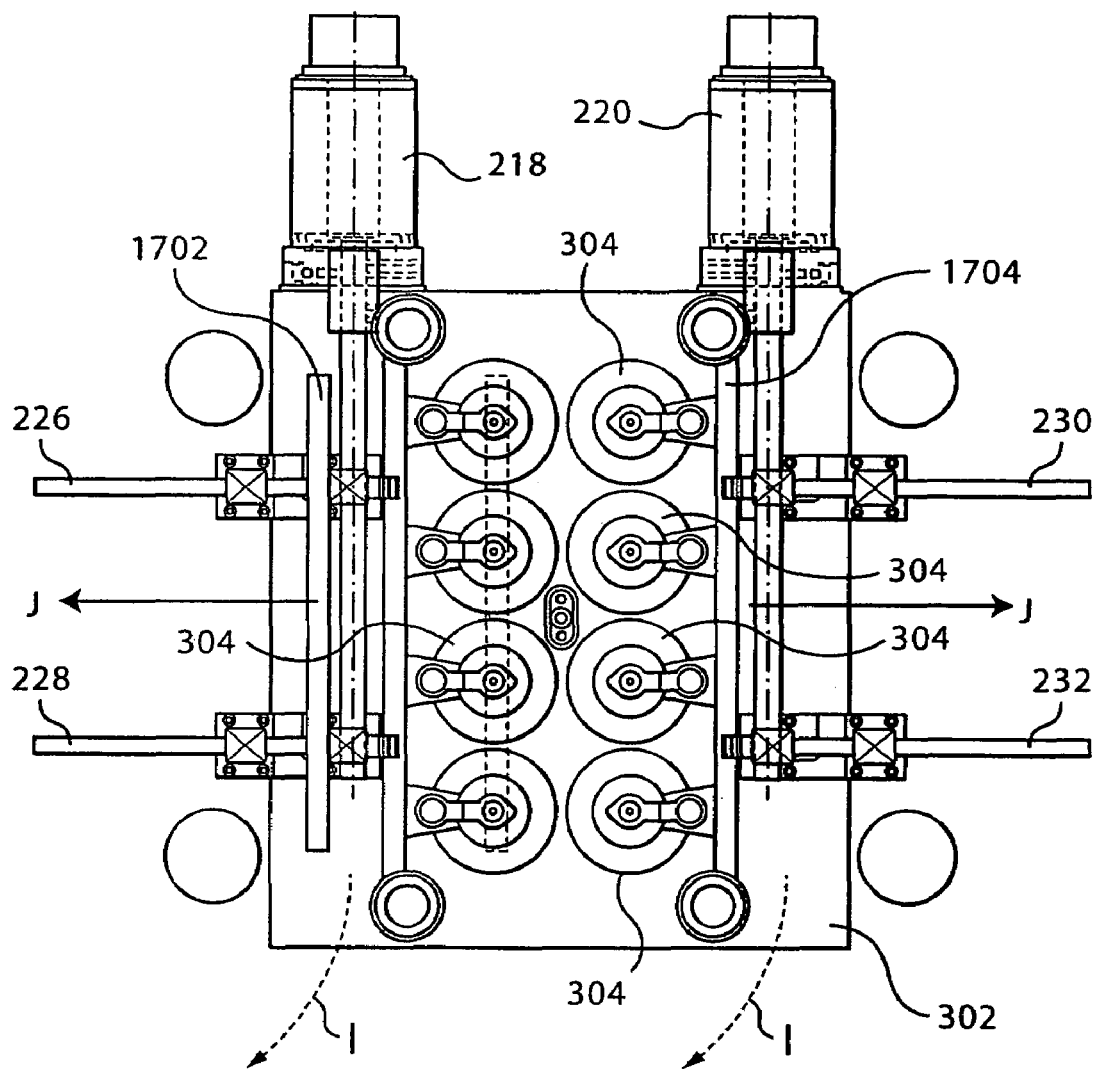
FIG. 17 is a plan view of a second embodiment of the present invention.

FIG. 17 is a plan view of a second embodiment of the servo side shuttle according to the present invention. In this embodiment, the servo side shuttle mechanism is used for another in-mold operation, such as closing and/or snapping a lid on a molded plastic container. While this embodiment will be described with respect to a two-shuttle-plate, two-column-cavity embodiment, any of the above-described alternatives of the FIG. 2 embodiment may be adapted for use in this embodiment as well.

In FIG. 17, servo motors 218,220 drive the respective drive shafts 222,224, the rack/linear rails 226,228,230,232, and the shuttle plates 1702,1704, in a manner generally similar to that described above with respect to FIG. 2. Molded parts (not shown) are dropped into two drop chutes (also not shown) for evacuation in the direction of arrows I. The movement of the shuttle plates 1702 and 1704 in the direction of arrows J causes lids 241 on the parts 240 on the cores 206 to be partially or fully closed, as will be described in greater detail with respect to FIG. 18.

Figure 18:
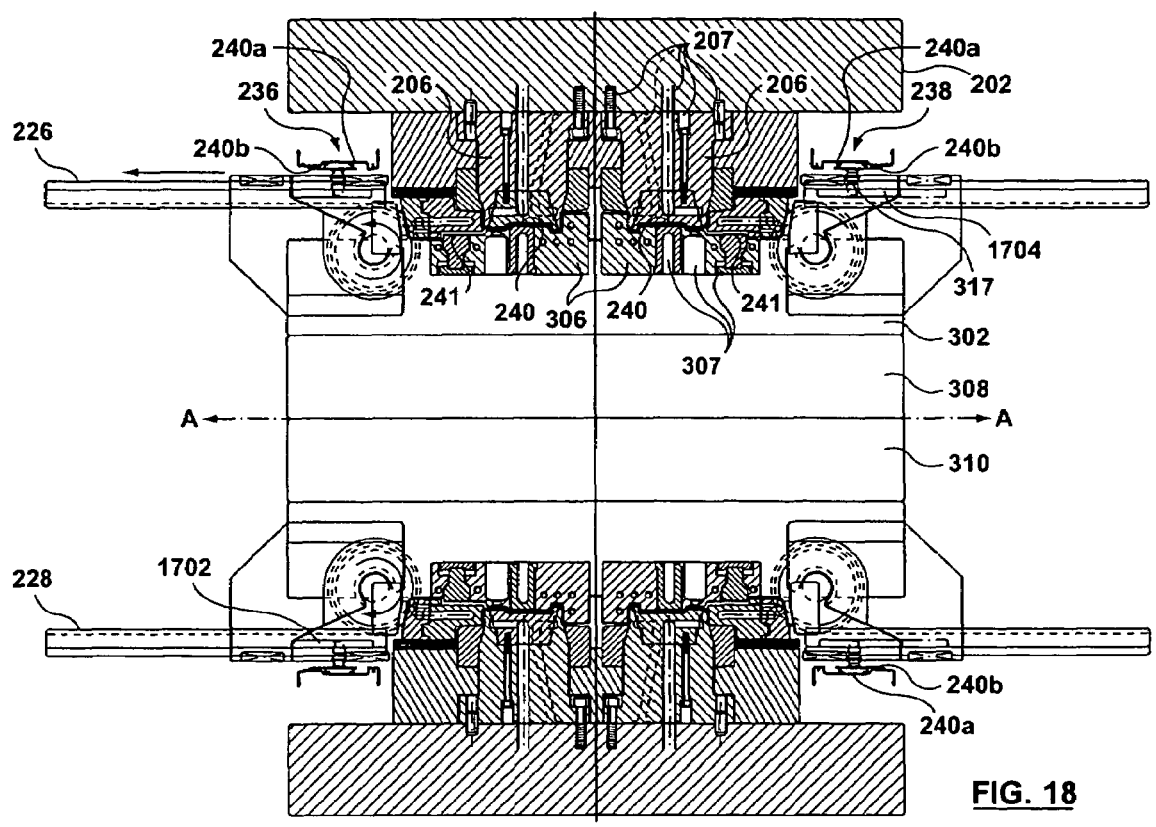
FIG. 18 is a top view of the second embodiment.

FIG. 18 is a top view of the FIG. 17 embodiment showing the mold halves closed. Core plate 202 includes cores 206, each core being shown with appropriate molding structure 207 therein, such as dowels, core caps, retainer screws, cooling channels, etc. The cavity plate 302 includes a plurality of cavities 306, each including appropriate molding structure 307 therein, such as cooling channels, injection nozzles, hot runners, etc. In the upper right portion of the drawing, the shuttle plate 1704 is shown positioned over the drop chute 238, with suction cup 316 having just released part 240. Note that the part 240 includes a body 240a and a closed lid 240b.

Figure 19:
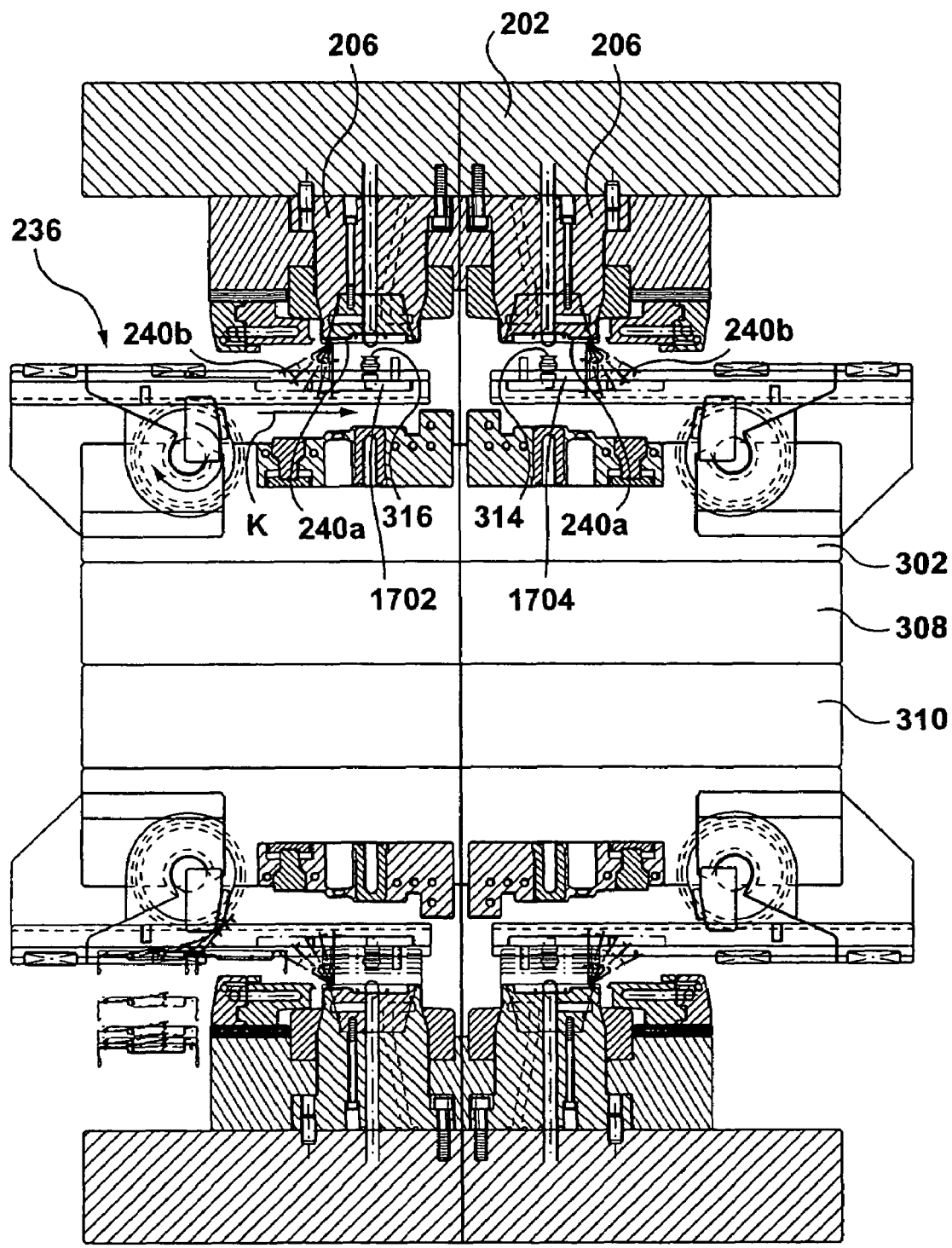
FIG. 19 is another top view of the second embodiment.

FIG. 19 is a top view of the FIG. 17 embodiment showing the mold halves open. Note that when the shuttle plate 1702 moves in the direction of arrow K, some portion of the shuttle plate (to be described more fully below) contacts the edge of lid 240b and swings it in a counterclockwise direction to a position where the lid is at an angle of about 90 degrees with respect to the main portion of the part body 240a. The part 240 is then stripped from the core 206 onto the suction cup 316, and the shuttle plate 1702 will then move linearly to the drop position, the lid 240a will be snapped closed by closing structure (described in detail below), and the part 240 will be dropped into drop chute 236.

Figure 20:
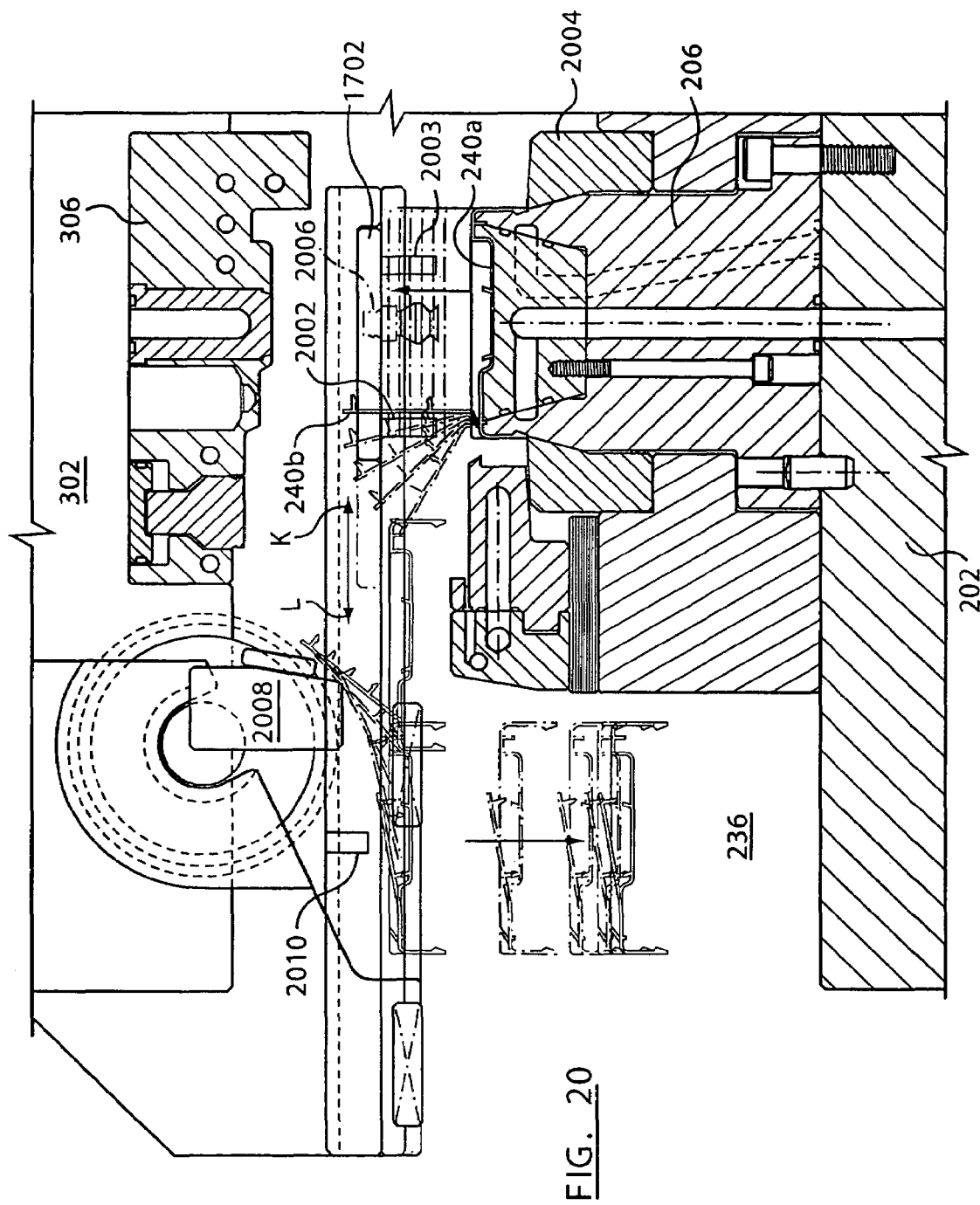
FIG. 20 is a further top view of the second embodiment.

FIG. 20 is a blow up view of the FIG. 17 embodiment, in which the cavity plate 302 and the core plate 202 are in the open position. The FIG. 20 structure can be operated in at least two alternatives. In alternative #1, a pick-up tab 2002 is coupled to the shuttle plate 1702 and picks-up the edge of lid 240b and swings it to the 90 degrees position when the shuttle plate 1702 moves in the direction or arrow K. Then, a stripper ring 2004 moves upward and forces the part body 240a into contact with a collapsing suction cup 2006. When the shuttle plate 1702 is retracted in the direction of arrow L, a closing bar 2008, which is mounted on the cavity plate 302, pushes the lid from the 90 degrees position to a position of about 175 degrees (from it's initial fully open position). Thereafter, when the mold halves close again, a closing tab 2010, which is also mounted on the cavity plate 302, snaps the lid 240b shut, using the pronged protrusions shown in the figure. This same mold-closing motion also strips the part 240 from the suction cup 2006 and drops it into the drop chute 236. Of course, the location of the pick-up tab may be varied to close the lid to any desired position, preferably one between about 90 degrees and about 175 degrees. The closing tab 2010 could also include an actuator for applying a supplemental closing force to the lid 240b.

In alternative #2 of FIG. 20, the pick-up tab 2003 is disposed to the right of the suction cup 2006, so that the motion of shuttle plate 1702 in the direction of arrow K causes the lid 240b to be rotated clockwise to a position of approximately 175 degrees. Then, as the stripper ring 2004 pushes the part 240 onto the collapsing suction cup 2006, the lid 240b is snapped shut, and the shuttle plate moves in the direction or arrow L to drop the part 240 into the drop chute 236. It is also possible that the lid is not snapped shut when the suction cup 2006 grasps the part 240, and in this instance, the closing tab 2010 could be used to snap the lid 240b shut before the part is dropped into the drop chute 236.

4. The Structure of the In-Mold Labeling Tooling

Figure 21:
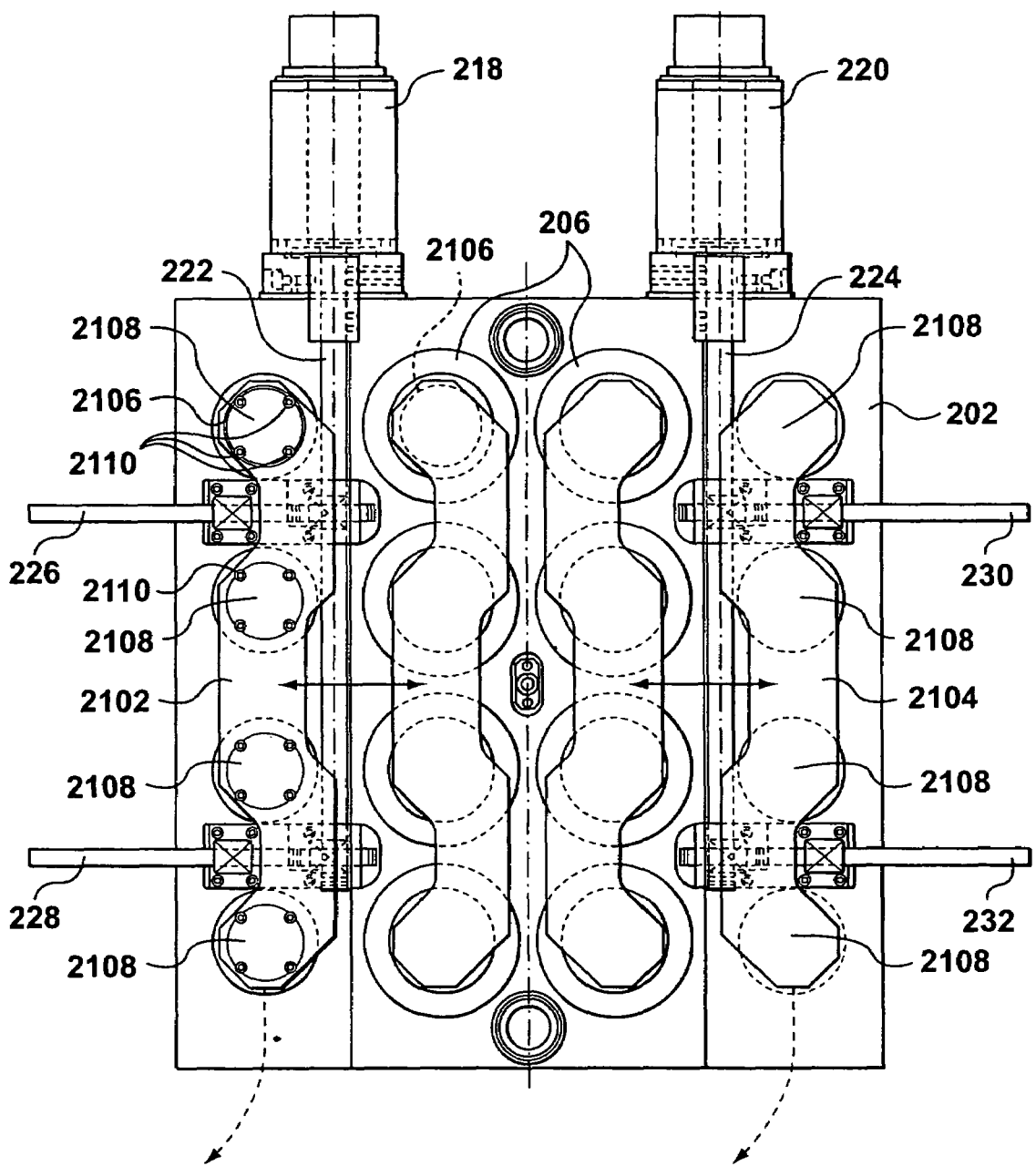
FIG. 21 is a plan view of a third embodiment of the present invention.

FIG. 21 is a plan view of a third embodiment of the present invention in which the shuttle plate is used to deposit a label into the cavity before the molten plastic is injected therein. While this embodiment will be described with respect to a two-shuttle-plate, two-column-cavity embodiment, any of the above-described alternatives of the FIG. 2 embodiment may be adapted for use in this embodiment as well. In the preferred stack mold, the servo motors 218,220 drive the drive shafts 222,224 which, in turn, drive the rack and pinion mechanism 226,228,230,232 that moves serpentine-shaped shuttle plates 2102 and 2104 into an open mold. There, a vacuum receiving mandrel and/or a suction cup on each shuttle plate receives the parts 240 from the cavities 304. Each of the shuttle plates 2102,2104 then moves out of the mold and the mandrel transfers the molded parts to a vacuum belt conveyor (not shown) or a drop chute. When the shuttle plates 2102,2104 are in their outboard position (when the mold halves are again closed), a floating plate 2106 attached to each shuttle plate (in a manner to be described more fully below) moves over a work piece receptacle 2108 and picks up a work piece for later transmission to the mold cavity.

In the present embodiment, the work piece comprises a label which will be affixed to the outside of the molded plastic container in a manner described below. However, the work piece may comprise other materials such as a container lid, a molded insert, a temperature sensitive element, electronic circuitry, batteries, filter element, diaphragm, etc., or any other device which may be useful in the finished product. The work piece receptacle 2108 preferably includes four vacuum ports (not shown) which are used to retain the labels in the receptacle. The work piece may be inserted into the mold cavity (or core) before the injection step, after the injection step, or in between injections of different layers (or other structure) of the molded article.

Figure 22:
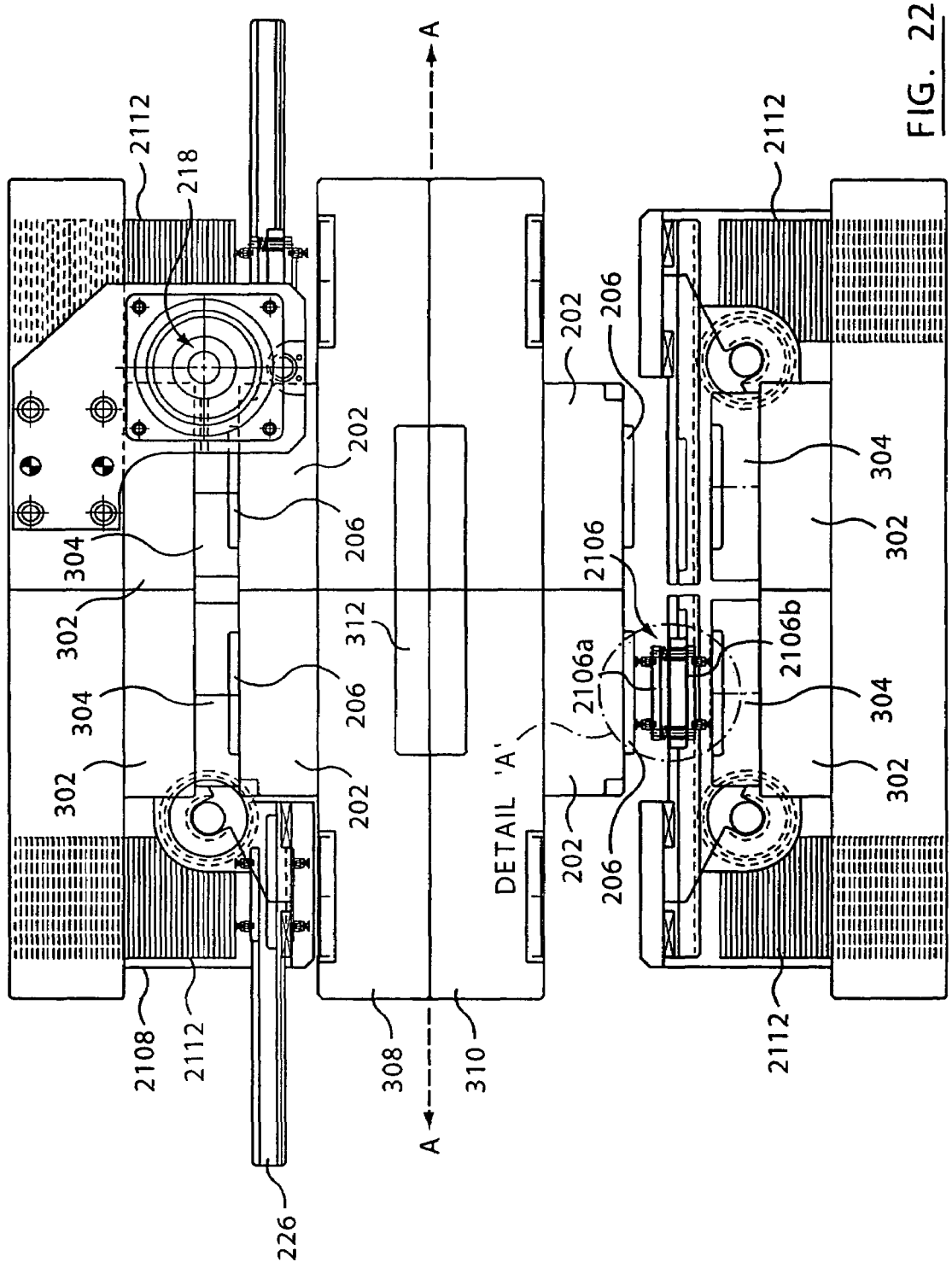
FIG. 22 is a detailed schematic view of the third embodiment.

FIG. 22 is a detailed schematic view of the FIG. 21 embodiment showing that each floating plate assembly 2106 comprises an upper plate 2106a and a lower plate 2106b. For illustration purposes only, the top half of FIG. 22 illustrates the mold in the closed configuration with the side shuttle parked, and the bottom half of FIG. 22 illustrates the mold in the open configuration with the side shuttle in the pick/transfer position. In the mold open position depicted in the bottom half of the figure, the floating plates 2106a,b are disposed between the core 206 and the cavity 304. The top half of FIG. 22 shows how the shuttle plate and floating plate are safely disposed in the park position when the mold halves are closed. Stacks of labels 2112 are held in receptacles 2108 by vacuum, static electricity, gravity, or any other convenient mechanism.

Figure 23:
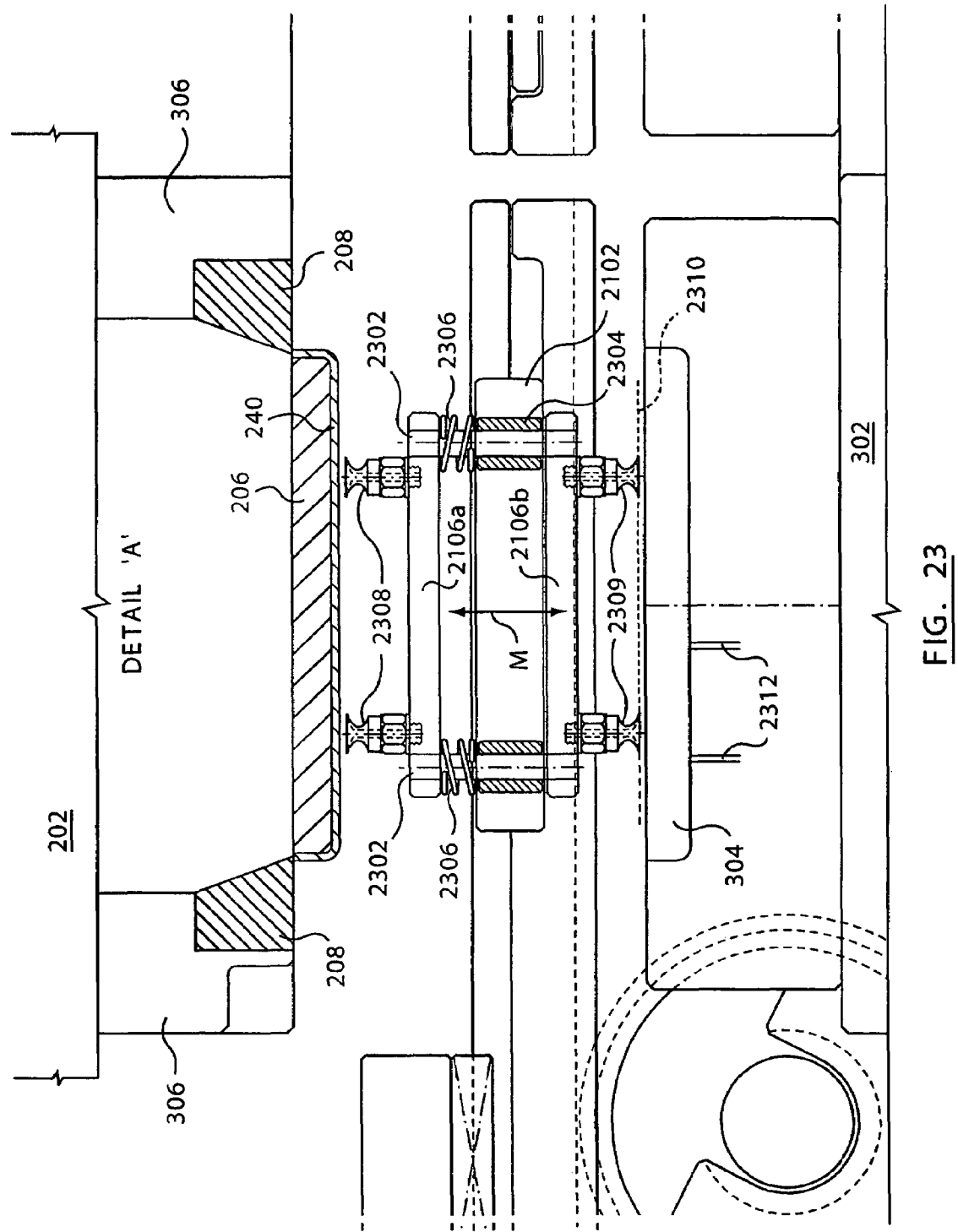
FIG. 23 is a top view of the third embodiment.

FIG. 23 is a detail view of the FIG. 22 structure. In FIG. 22, the core plate 202 and the cavity plate 302 are in the mold open position with a part 240 disposed on core 206 and about to be stripped therefrom by stripper ring 208. The floating plates 2106a,2106b are mounted on opposite sides of the shuttle plate 2102 with shafts 2302 and bushings 2304 so that the plates "float" in the direction of arrow M. Springs 2306 (or any other biasing means) are disposed between an upper surface of the shuttle plate 2102 and a lower surface of the floating plate 2106a in the manner shown to urge the floating plates to a home position with the part handling plate 2106a biased away from the shuttle plate. In operation, the parts 240 being stripped by stripper ring 208 are grasped by the suction cups 2308, the stripping action acting through the part 240 pushes the floating plates 2106a, 2106b towards the molding cavity 304 and positions the label 2310 at a predetermined location. Thereafter, the label is released from suction cups 2309 into the cavity 304 on the bottom (or other desirable surface location, e.g., the side) of cavity 304, the stripper ring 208 is retracted, the floating plates 2106a, 2106b return to their home position, and the shuttle plate is retracted to the part drop position. The stripping action could alternatively be coupled between the floating plates 2106a, 2106b through pins (not shown) that engage the stripper ring 208. The label may be held in place in the cavity 304 by means of vacuum channels 2312 or other retaining means such as electrostatic charge.

In summary, the stripper ring 208 moves the floating plates 2106a,2106b downwardly as it ejects the parts 240 until the lower floating plate 2106b reaches the bottom of the mold and the labels 2310 held by the suction cups 2309 can be transferred to the mold at the same time as the previously molded parts 240 are transferred to the suction cups 2308. When the floating plates 2106a,2106b are back in the home position, the main shuttle 2102 is retracted from the mold and the parts 240 are discharged into the drop chute and labels 2310 are loaded onto the suction cups 2309 to prepare the shuttle for the next cycle.

5. The Operation

The operation of the various structures according to the present invention has been described above. The overall operation of one molding operation according to the preferred embodiments proceeds as outlined below.

Steps:
1. Inject molten plastic into the mold cavity;
2. Open mold;
   2.1. Move shuttle to the pickup position;
   2.2. Part ejection/transfer to side shuttle tooling;
      2.2.1. (optional) Work piece (e.g. label) transfer;
      2.2.2. (optional) Intermediate mold full or partial closings to effect transfers/operations;
   2.3. Move shuttle to the drop position, which may be the same or different from the parked position;
3. Close mold;
   3.1. Strip the part from the side shuttle tooling; and
   3.2. (optional) work piece (e.g. label) pickup.

6. Advantageous Features

The servo side shuttle system offers gains in a reduction in cycle time, an increase in mold cavities able to be serviced, reduced capital investment, and improved positional accuracy. Specifically:

(1) In-mold handling/labeling of molded articles requires less time since the shuttle plate is inboard of the mold, and hence has a shorter distance to travel than a robot plate that must completely exit the molding area. Further reduction of cycle time is possible where a multiplicity of servo side shuttles is provided on a single mold face (e.g. total horizontal travel is divided by two by having a left and a right side shuttle).

(2) The inboard handling of molded articles between their molding cavities and the drop chutes with the servo side shuttle is a substantially linear motion and has a reduced mold opening stroke requirement relative to inboard part handling with servo swing chutes wherein the articles are handled through a large arc and hence more space between the mold halves is required.

(3) By example, an 8.5" lid would require an opening stroke in excess of the 10-12" rotational arc to swing the part with a conventional swing chute whereas for the same part, the SSS would require only 2-3" of stroke, and thereby provide a dramatic cycle time savings from the reduced time required for mold stroking.

(4) By harnessing the movement of the mold stripper plate/ejection mechanism on the core side to interact with the shuttle plate to transfer the work piece into the mold eliminates an actuator and related controller feedback and thereby saves on cost and weight, the weight savings and controller simplification (no signal delay time for tooling plate actuator) provides potential cycle time savings.

(5) Known in-mold labeling systems are considered limited to servicing cavitations of 2×4 due to the size, weight, positional accuracy, and related stability of the robot arm, whereas the servo side shuttle is able to handle cavitations of 2×8 or higher due to a stable in-mold installation, and a lighter and compact construction enabled by the shorter stroke distance, shuttle weight (i.e. no onboard actuators). Further, typical standalone in-mold labeling systems lose precision due to relative movements of robot/machine/mold, whereas the present invention contemplates inboard mounting (i.e. fastening everything to the mold) for improved operating accuracy.

(6) The technology is not limited to in-mold labeling, but may have more generic use for introducing inserts into the molding cavity.

(7) The method of operating the side shuttle wherein the molded articles are handled from the molding cavity to the drop chute preserves the orientation of the molded article that may advantageous for post-molding operations such as stacking/packaging. Further, the inboard installation of the side shuttle and its inherent alignment accuracy provides for the accurate orientation and placement of molding inserts such as labels.

7. Conclusion

Thus, what has been described is a servo side shuttle apparatus and method capable of providing a wide array of operations on in-mold articles, which will greatly reduce the cycle time and cost of producing molded parts.

Any U.S. and foreign patent document discussed above is hereby incorporated by reference into the Detailed Description of the Preferred Embodiment.

The individual components shown in outline or designated by blocks in the attached Drawings are all well-known in the molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A molded article work piece application method, comprising the steps of:
   driving a shuttle plate only in one or more coplanar linear directions;
   applying a work piece to at least one of (i) a molded article resident in at least one of a mold core and a mold cavity, and (ii) at least one of the mold core and the mold cavity, with a work piece application device coupled to the shuffle plate;
   removing the molded article from at least one of the mold cavity and the mold core; and
   driving the shuttle plate only in one or more coplanar linear directions to move the work piece application device and the molded article to a work piece and molded article pick up location;
   wherein said work piece application device comprises a label application device, and wherein said applying step comprises the step of applying a label to an inside surface of the mold cavity;
   said label application device includes a label suction member and an article suction member, and wherein said applying step comprises the step of applying the label with the label suction member; and
   the first driving step drives the shuttle plate in a first direction to (i) move the article suction member to a position adjacent a just-molded article on the mold core, and (ii) move the label suction member, which is holding the label, to a position adjacent the mold cavity, and wherein after the article has been stripped from the mold core, the second driving step drives the shuttle plate a second direction to (iii) move the article suction member to a position to eject the just-molded article from the mold, and (iv) move the label suction member to a position adjacent the work piece pick up location.

2. A method according to claim 1, further comprising the step of retaining the label within the mold cavity after the mold has closed.

3. A method according to claim 1, wherein said applying step comprises the step of applying a label to an inside surface of the mold cavity at a same time as the molded article is stripped from the mold core.

4. A method according to claim 1, further comprising the step of closing the mold core and the mold cavity, and wherein said closing step includes the step of causing the work piece application device to pick up a label from a label pickup location.

5. A molded article lid closing method, comprising the steps of:
   first, driving a shuttle plate only in one or more coplanar linear directions; and
   during the first driving step, (i) at least partially closing a lid of a molded article that is resident on one of a mold core and a mold cavity, with a lid closing device that is coupled to the shuttle plate, and (ii) grasping a molded article that is resident on one of the mold core and the mold cavity;
   second, driving the shuttle plate only in one or more coplanar linear directions after the lid of the molded article is at least partially closed.

6. A method according to claim 5, further comprising the step of, during the second driving step, further closing the partially closed lid of the molded article, with closing structure coupled to the a mold.

7. A method according to claim 6, wherein the molded article comprises an injection molded plastic article that is resident on a mold core, and wherein the partially closing step closes the lid to an angle of between about 90 degrees and about 175 degrees with respect to an injection-molded position.

8. A method according to claim 7, wherein said plate includes a suction member configured to remove the molded article from the mold core, and wherein the partially closing step includes the step of partially closing the lid using a tab member affixed to the shuttle plate on one side of the suction member.

9. A method according to claim 8, wherein, after said suction member has removed the molded article from the mold core, the second drive step drives the shuttle plate in a direction to place the molded article adjacent a molded article evacuation location.

* * * * *